(12) United States Patent
Haase et al.

(10) Patent No.: US 12,734,844 B2
(45) Date of Patent: Sep. 15, 2026

(54) TOOL FOR TRANSFERRING A MOTOR VEHICLE INTO A ROLLABLE STATE, MOTOR VEHICLE AND USE

(71) Applicant: Bayerische Motoren Werke Aktiengesellschaft, Munich (DE)

(72) Inventors: Stefan Haase, Munich (DE); Martin Rosshuber, Dachau (DE); Stefan Schoenberger, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 664 days.

(21) Appl. No.: 18/182,681

(22) Filed: Mar. 13, 2023

(65) Prior Publication Data

US 2023/0286318 A1 Sep. 14, 2023

(30) Foreign Application Priority Data

Mar. 14, 2022 (DE) ..................... 10 2022 105 885.9

(51) Int. Cl.
*B60B 35/00* (2006.01)
*B60B 35/02* (2006.01)
*B60B 35/04* (2006.01)

(52) U.S. Cl.
CPC .......... *B60B 35/004* (2013.01); *B60B 35/025* (2013.01); *B60B 35/04* (2013.01)

(58) Field of Classification Search
CPC ......... Y10T 29/53683; Y10T 29/53796; Y10T 29/538; Y10T 29/53848; Y10T 29/53857; Y10T 29/53861; Y10T 29/53878; Y10T 29/53909; Y10T 29/53926; Y10T 74/194; B25B 27/0035; B25B 27/0064; B25B 27/02; B25B 27/023; B25B 27/14; B25B 27/16

(Continued)

(56) References Cited

U.S. PATENT DOCUMENTS 4,989,312 A * 2/1991 Maddalena ........... B25B 27/023 29/259
2004/0088844 A1* 5/2004 Klann ..................... B25B 27/18 29/263

FOREIGN PATENT DOCUMENTS

CN 112405438 A * 2/2021 ............. B25B 27/14
DE 10 2010 029 401 B4 12/2011

(Continued)

OTHER PUBLICATIONS

CN112405438—Machine Translation (Year: 2021).*

*Primary Examiner* — Brian D Keller
*Assistant Examiner* — Alberto Saenz
(74) *Attorney, Agent, or Firm* — Crowell & Moring LLP

(57) ABSTRACT

A tool for transferring a motor vehicle into a rollable state despite a parking lock having been activated includes a base which is fastenable to a vehicle wheel of the motor vehicle and an actuating element which is displaceable along a sliding direction relative to the base and via which, in a state of the base fastened to the vehicle wheel, by displacement of the actuating element along the sliding direction relative to the base, displacing a propeller shaft of the motor vehicle, a toothing engagement between a first toothing of the propeller shaft and a second toothing of a wheel hub can be undone, as a result of which the motor vehicle can be transferred into the rollable state. A travel limiting device specifies a travel by which the actuating element can be displaced at most relative to the base in order to undo the toothing engagement.

17 Claims, 9 Drawing Sheets

(58) Field of Classification Search
USPC ............................ 269/181; 74/424.79; 81/54
See application file for complete search history.

(56) References Cited

FOREIGN PATENT DOCUMENTS

| | | | |
|---|---|---|---|
| DE | 10 2011 088 668 | B4 | 6/2013 |
| EP | 1 879 763 | B1 | 1/2008 |

* cited by examiner 3
16
16
17
16
18
16
16
19

TOOL FOR TRANSFERRING A MOTOR VEHICLE INTO A ROLLABLE STATE, MOTOR VEHICLE AND USE

CROSS REFERENCE TO RELATED APPLICATION

This application claims priority under 35 U.S.C. § 119 from German Patent Application No. 10 2022 105 885.9, filed Mar. 14, 2022, the entire disclosure of which is herein expressly incorporated by reference.

BACKGROUND AND SUMMARY OF THE INVENTION

The invention relates to a tool for transferring a motor vehicle into a rollable state despite a parking lock of the motor vehicle having been activated. The invention also relates to a motor vehicle, in particular a car, having at least one such tool. In addition, the invention relates to the use of such a tool.

DE 10 2010 029 401 B4 discloses a parking lock arrangement for a drive train of a motor vehicle. DE 10 2011 088 668 B4 discloses a drive device, having at least one electric machine. Furthermore, a drive unit for a motor vehicle is known from EP 1 879 763 B1.

Furthermore, motor vehicles, in particular in the form of cars, very particularly in the form of passenger cars, are known from the general prior art and in particular from series production of vehicles. The respective motor vehicle has a parking lock which is also referred to as a transmission lock and by means of which, for example, whenever the motor vehicle is placed, that is to say parked, on a slope, can be secured against undesirably rolling away. The parking lock is conventionally adjustable between an engaged state, also referred to as an activated state, and a disengaged state, also referred to as a deactivated state, wherein the motor vehicle is secured by means of the parking lock in the engaged state against undesirable rolling. In order to permit rolling of the motor vehicle, for example whenever the motor vehicle is intended to be driven, the parking lock is transferred from the engaged state into the disengaged state. This conventionally takes place using an actuator which is operated, for example, by means of electrical energy. For example, whenever supplying the actuator with energy in order to disengage the parking lock is not possible, an emergency release of the parking lock is desirable. By means of the emergency release, the parking lock can be brought from the engaged state into the disengaged state, specifically without using the actuator. However, conventional emergency release mechanisms can be highly complicated, in particular whenever the emergency release mechanisms are designed as mechanical emergency release mechanisms.

It is therefore the object of the present invention to provide a tool, a motor vehicle and a use such that the motor vehicle can be transferred, that is to say brought, in a particularly simple manner into a rollable state despite a parking lock of the motor vehicle having been activated.

A first aspect of the invention relates to a tool for transferring a motor vehicle in the form, for example, of a car, in particular a passenger car, into a rollable state of the motor vehicle despite a parking lock of the motor vehicle having been activated. This means that the motor vehicle in its fully manufactured state has a parking lock which is also referred to as a transmission lock. The motor vehicle can be secured by means of the parking lock against undesirably rolling away. For this purpose, the parking lock is adjustable between an engaged state and a disengaged state. The engaged state is also referred to as the activated state, and the disengaged state is also referred to as the deactivated state of the parking lock. If the parking lock is in the engaged state, the parking lock is activated. If the parking lock is in a disengaged state, the parking lock is deactivated. The parking lock has in particular the following function: the motor vehicle has at least one drive device which can have an internal combustion engine and/or at least one electric engine. The motor vehicle can be driven by means of the drive device. The motor vehicle has, for example, at least or precisely two vehicle axles which are arranged one behind another in particular in the longitudinal direction of the vehicle and are also referred to as axles. The respective vehicle axle has at least or precisely two vehicle wheels which are also referred to simply as wheels. The respective vehicle wheels of the respective vehicle axle are arranged on mutually opposite sides in the transverse direction of the vehicle. The wheels of at least one or precisely one of the vehicle axles can be driven by means of the drive device, the vehicle wheels which can be driven by means of the drive device also being referred to as drive wheels. The vehicle wheels are ground contact elements via which the motor vehicle can be supported or is supported downwardly on the ground. If the motor vehicle, which is also simply referred to as vehicle, is driven along the ground while the motor vehicle is supported downwardly in the vertical direction of the vehicle on the ground, the vehicle wheels roll on the ground. The vehicle axle having the drive wheels is also referred to as a drive axle. The drive axle has an axle drive which is also referred to as a differential or as a differential gear and via which the drive wheels can be driven by the drive device. In particular, the axle drive has the function, which is already well known from the prior art, that a respective torque which is provided or can be provided by the drive device is distributed to, or divided between the drive wheels, consequently is transmitted, by means of the axle drive. In addition, for example, the axle drive permits different rotational speeds of the drive wheels when the motor vehicle drives through bends, in particular in such a manner that the outer wheel on the bend can rotate at a greater rotational speed than the inner vehicle wheel on the bend, in particular while the drive wheels are coupled to the drive device via the axle drive, and therefore the torque can be transmitted to the drive wheels via the axle drive. The respective drive wheel can be driven via a respective propeller shaft. The respective propeller shaft is connected to a respective driven gearwheel so as to transmit torque, the driven gearwheels being component parts of the axle drive. The axle drive also has compensating gearwheels. The compensating gearwheels and the driven gearwheels can be designed as bevel gears, in particular whenever the axle drive is in the form of a bevel gear differential. The axle drive here has, for example, an input gearwheel which is conventionally in the form of a ring gear and which can be driven by the drive device, in particular by a drive shaft of the drive device, and can thereby be rotated about an input gearwheel axis of rotation relative to a chassis of the motor vehicle. The chassis is, for example, a body of the motor vehicle designed in particular as self-supporting bodywork. The compensating gearwheels can be rotated together with the input gearwheel about the input gearwheel axis of rotation relative to the chassis, in particular whenever the transmission lock is disengaged. In addition, the compensating gearwheels are rotatable relative to one another and relative to the input gearwheel about a common compensating gearwheel axis of rotation, the compensating gearwheel axis of rotation running perpendicularly to the input gearwheel axis of rotation. For example, the input gearwheel is connected for conjoint rotation to a base device which, for example, is also referred to as a differential cage or can be in the form of a differential cage. In this case, for example, the respective compensating gearwheel is held on the base device so as to be rotatable about the compensating gearwheel axis of rotation. In addition, the driven gearwheels, which are also referred to as output gearwheels, are rotatable about the input gearwheel axis of rotation relative to the input gearwheel and relative to one another, for example in such a manner that the output gearwheels are held on the base device so as to be rotatable about the input gearwheel axis of rotation. If, for example, the parking lock is now engaged, the input gearwheel and therefore the compensating gearwheels and, for example, the base device are secured by means of the parking lock, in particular with a form fit, against rotation about the input gearwheel axis of rotation relative to the chassis, in particular in such a manner that the input gearwheel is connected nonrotatably to the chassis at least indirectly via the parking lock. By this means, the motor vehicle, for example whenever it is placed and parked on a slope, is secured against undesirable rolling away since the propeller shafts and therefore the drive wheels cannot rotate in the same direction of rotation relative to the chassis. The background in this regard is in particular that a first of the propeller shafts is connected to a first of the drive wheels for conjoint rotation or at least in such a manner that torques can be transmitted between the first propeller shaft and the first drive wheel and that relative rotations between the first drive wheel and the first propeller shaft are stopped, with the second drive wheel being connected to the second propeller shaft for conjoint rotation or at least in such a manner that torques can be transmitted between the second drive wheel and the second propeller shaft and that relative rotations between the second drive wheel and the second propeller shaft are stopped. In other words, when the parking lock is engaged, the propeller shaft, and therefore the drive wheels, cannot be simultaneously rotated in the same direction of rotation relative to the chassis when the motor vehicle is supported downwardly in the vertical direction of the vehicle on the ground. If the parking lock is disengaged, for example, the parking lock permits rotation of the input gearwheel, and therefore of the compensating gearwheels and in particular also the base device, about the input gearwheel axis of rotation relative to the chassis such that the propeller shafts and the drive wheels can then rotate simultaneously in the same direction of rotation relative to the chassis. It is also worth mentioning that, for example, whenever the motor vehicle is raised, when the parking lock is engaged, so that the drive wheels are not supported on any ground and, as it were, float in the air, the first drive wheel, for example, can be rotated in a first direction of rotation relative to the chassis despite the parking lock having been engaged, as a result of which the second drive wheel is driven by the first drive wheel via the propeller shafts in such a manner that the second drive wheel is rotated relative to the chassis in a second direction of rotation opposed to the first direction of rotation. This is possible since the input gearwheel, and therefore, for example, the base device is secured by means of the engaged parking lock against rotation about the input gearwheel axis of rotation relative to the chassis, but the output gearwheels, which mesh with the compensating gearwheels, are rotatable relative to one another and relative to the input gearwheel about the input gearwheel axis of rotation, and the compensating gearwheels are rotatable about the compensating gearwheel axis of rotation relative to the input gearwheel and also relative to one another. If, for example, the first drive wheel is then rotated, the first propeller shaft is thereby rotated and, consequently, drives a first of the output gearwheels and, as a result, rotates, for example, in the first direction of rotation about the input gearwheel axis of rotation relative to the input gearwheel. By this means, the compensating gearwheels are rotated in the opposite direction about the compensating gearwheel axis of rotation relative to the input gearwheel, as a result of which the second output gearwheel is rotated in the second direction of rotation about the input gearwheel axis of rotation relative to the input gearwheel. As a result, the second output gearwheel drives the second propeller shaft which consequently starts to rotate the second drive wheel and thereby rotates in the second direction of rotation. However, the vehicle wheels and therefore the propeller shafts cannot be rotated simultaneously in the same direction of rotation, and therefore, whenever the motor vehicle is supported on the ground via the drive wheels, and consequently the drive wheels are in contact with the ground, and the parking lock is engaged, the motor vehicle is secured against rolling away.

As is described more precisely below, the tool according to the invention now permits mechanical release, in particular mechanical emergency release, of the parking lock. The mechanical release, in particular the mechanical emergency release, of the parking lock should be understood as meaning that, by means of the tool, the parking lock can be brought mechanically, in particular purely mechanically, from the engaged state into the disengaged state, consequently from the activated state into the deactivated state, without an actuator of the motor vehicle having to be operated for this purpose. The tool according to the invention therefore permits release of the parking lock mechanically, in particular purely mechanically, that is to say without the aid of electrical or pneumatic or hydraulic energy. In this case, the tool may be an equipment feature of the motor vehicle, but the tool is not installed fixedly in or on the motor vehicle, but rather the tool is a tool which can be freely handled and is therefore movable freely relative to the motor vehicle and which can be moved, for example by a person, at least virtually as desired relative to the motor vehicle and therefore can also be moved far away from the motor vehicle. The tool therefore permits motor release of the parking lock without the aid of a mechanical emergency release mechanism installed fixedly on or in the motor vehicle, and therefore, for example, an, in particular purely, mechanical emergency release mechanism installed fixedly on or in the motor vehicle and intended for the mechanical, in particular purely mechanical, release of the parking lock can be dispensed with. Furthermore, the tool according to the invention can be used additionally or alternatively to an electric emergency release mechanism installed, for example, fixedly on or in the motor vehicle and by means of which, for example, the parking lock can be electrically released, that is to say can be transferred from the engaged state into the disengaged state.

Where one of the vehicle wheels, the vehicle wheel or the vehicle wheels, is or are discussed below, this should be understood as meaning, unless stated otherwise, the previously described drive wheels of the drive axle.

The tool according to the invention has a base which is fastenable to one of the vehicle wheels, consequently to one of the drive wheels, in particular so as to be reversibly releasable, that is to say so as to be releasable without being destroyed. This means that the base can be fastened to the one vehicle wheel and can be released from the one vehicle wheel without damage or destruction of the one vehicle wheel or of the tool or of the base occurring. The tool furthermore has an actuating element which is displaceable along a sliding direction relative to the base. In the state of the base, and therefore of the tool, fastened to the vehicle wheel, the sliding direction runs, for example, parallel to the axial direction of the vehicle wheel, or the sliding direction coincides with the axial direction of the vehicle wheel. In the state of the base fastened to the vehicle wheel, by means of the actuating element, by displacement of the actuating element along the sliding direction relative to the base, displacing the propeller shaft which belongs to the vehicle wheel and by which the vehicle wheel can be driven, a toothing engagement between a first toothing of the propeller shaft belonging to the vehicle wheel and a second toothing of a wheel hub, to which the vehicle wheel is connected for conjoint rotation, can be undone, as a result of which the motor vehicle can be transferred into its rollable state. In other words, if the vehicle wheel is, for example, the previously mentioned first drive wheel, the propeller shaft belonging to the vehicle wheel is the first propeller shaft. If, for example, the vehicle wheel is the previously mentioned second drive wheel, the propeller shaft belonging to the vehicle wheel is the second propeller shaft. The vehicle wheel is connected to the wheel hub mentioned for conjoint rotation. In this case, the wheel hub has the previously mentioned first toothing, and the propeller shaft belonging to the vehicle wheel has the previously mentioned second toothing. Where the propeller shaft is discussed below, this should be understood as meaning, unless stated otherwise, the propeller shaft belonging to the vehicle wheel. The previously mentioned toothing engagement should be understood as meaning that first of all the toothings engage in one another, consequently one of the toothings engages in the other toothing, and vice versa. The first toothing has first teeth and first tooth gaps, and the second toothing has second teeth and second tooth gaps. Accordingly, the toothing engagement should be understood as meaning that the first teeth engage in the second tooth gaps and the second teeth engage in the first tooth gaps. In particular the respective toothing is in particular an axial toothing which is also referred to as the axial toothing and which is arranged, provided or formed on end faces of the wheel hub and of the propeller shaft that face one another in the axial direction of the vehicle wheel and therefore of the wheel hub. If the toothing engagement is formed or produced so that the toothings engage in one another, consequently are in engagement with one another, the wheel hub and the propeller shaft are connected to one another for conjoint rotation or at least in such a manner that torques can be transmitted between the wheel hub and the propeller shaft and that relative rotations between the wheel hub and the propeller shaft are stopped. Since, furthermore, the vehicle wheel is connected to the wheel hub for conjoint rotation, whenever the toothing engagement is formed or produced, the wheel hub, the vehicle wheel and the propeller shaft are connected to one another for conjoint rotation or at least in such a manner that torques can be transmitted between them and relative rotations are stopped. By this means, whenever the parking lock is engaged and the motor vehicle is supported on the ground via the drive wheels, the motor vehicle is secured against undesirably rolling away. If the toothing engagement is undone by means of the tool so that the toothings then no longer intermesh, the wheel hub is thereby decoupled from the propeller shaft, and therefore, in consequence, the wheel hub and, with the latter, the vehicle wheel can be rotated relative to the propeller shaft. The tool according to the invention makes use here of the fact that the propeller shaft has at least one joint, in particular at least or precisely two joints, with the respective joint of the propeller shaft preferably being designed as a tripod joint. The joint of the propeller shaft permits the propeller shaft to be displaced in the axial direction of the propeller shaft and/or in the axial direction of the vehicle wheel. In other words, the joint of the propeller shaft permits at least part of the propeller shaft to be displaced along the displacement direction in such a manner that, by at least part of the propeller shaft being displaced along the sliding direction, the toothing engagement can be undone, consequently released, such that the toothings no longer engage in one another. This means in particular that, as a result of the actuating element being displaced along the sliding direction relative to the base and preferably also relative to the vehicle wheel and relative to the wheel hub, at least part of the propeller shaft and, as a result, the first toothing are slid away from the second toothing, and therefore in particular from the wheel hub, along the displacement direction in such a manner that the toothing engagement is undone. By the toothing engagement being undone, the motor vehicle is transferred into the rollable state although the parking lock is (still) engaged. The rollable state of the motor vehicle should be understood as meaning that the drive wheels can be rotated in the same direction of rotation relative to the chassis, in particular while the motor vehicle is supported on the ground via the drive wheels, consequently while the drive wheels are in contact with the ground. This is possible in particular by the fact that, by the toothing engagement being undone, for example whenever the vehicle wheel is the first drive wheel and the associated propeller shaft is the first propeller shaft, the first drive wheel (vehicle wheel) and, with the latter, the wheel hub, which is also referred to as the first wheel hub, can be rotated without a torque being transmitted between the first vehicle wheel and the first propeller shaft, consequently without the first vehicle wheel driving the first propeller shaft. The second drive wheel, in particular via its associated second wheel hub, can remain connected to the second propeller shaft so as to transmit torque, and nevertheless the second drive wheel can be rotated in the same direction of rotation as the first drive wheel by the fact that, when the parking lock has been activated, although, as previously described, rotation of the input gearwheel and of the compensating gearwheels about the input gearwheel axis of rotation relative to the chassis is stopped, whenever the second drive wheel is rotated in the same direction of rotation as the first drive wheel, consequently the drive wheels are rotated simultaneously in the second direction of rotation, the second drive wheel drives the second propeller shaft, which drives the first propeller shaft via the output gearwheels and the compensating gearwheels, in such a manner that the first propeller shaft rotates in the opposite direction to the second propeller shaft and in the opposite direction to the second drive wheel and also in the opposite direction to the first drive wheel, which is made possible by the fact that, in the present example, the toothing engagement between the first propeller shaft and the wheel hub belonging to the first drive wheel has been undone. The invention therefore makes use of the design of the axle drive described for carrying out the previously described function of the axle drive, to the effect that, when the parking lock has been activated, the drive wheels and the propeller shafts can be rotated in the opposite direction if the drive wheels are not in contact with the ground. By the toothing engagement being undone, for example, the first propeller shaft is decoupled from the first drive wheel or from the wheel hub, which belongs to the first drive wheel and to which the first drive wheel is connected to conjoint rotation, such that then, for example, the first drive wheel can be rotated in the first direction of rotation relative to the chassis, but without driving the first propeller shaft, and at the same time the second drive wheel can be rotated in the first direction of rotation relative to the chassis and, in the process, can drive the second propeller shaft and, via the compensating gearwheels and the output gearwheels (driven gearwheels), the first propeller shaft in such a manner that the first propeller shaft rotates in the opposite direction to the second propeller shaft, the second drive wheel and the first drive wheel. The invention is therefore not aimed at releasing the parking lock itself, but rather the tool according to the invention permits the toothing engagement to be undone simply, conveniently and cost-effectively in order, as a result, without releasing the parking lock, that is to say while the parking lock remains activated, to make the motor vehicle rollable despite the parking lock having been activated. As a result, for example, the motor vehicle can be rolled and therefore pushed and/or dragged, for example by one person or by several people, while the parking lock is activated.

In order to avoid undesirable effects resulting from the toothing engagement being undone, for example damage and/or excessive soiling, for example of one of the joints of the propeller shaft, the tool according to the invention moreover has a travel limiting device which can be used or is used to specify a travel by which the actuating element can be displaceable at maximum relative to the base in order to undo the toothing engagement. The travel limiting device therefore ensures that the actuating element and therefore via the actuating element, for example, the propeller shaft are not displaced excessively far relative to the vehicle wheel and relative to the wheel hub. The tool can therefore be handled particularly easily and safely, and therefore the motor vehicle can be brought by means of the tool according to the invention, in particular purely mechanically, into its rollable state, in particular without having to release the parking lock per se.

In order to be able to fasten the tool to the vehicle wheel in a particularly simple manner and therefore to bring, that is to say transfer, the motor vehicle particularly simply into its rollable state, provision is made, in one embodiment of the invention, that the base has a screw-in element which can be screwed to a thread, which is provided for fastening the vehicle wheel to the wheel hub, in order thereby to fasten the base to the vehicle wheel. For example, the screw-in element is in the form of a screw. The screw-in element preferably has an external thread, with the thread provided on the wheel hub preferably being an internal thread corresponding to the external thread. In order therefore, for example, to fasten the base to the vehicle wheel, for example a wheel nut which is initially screwed to the thread of the wheel hub and by means of which the vehicle wheel is connected to the wheel hub for conjoint rotation, is released, unscrewed and removed from the thread. Then, for example, the screw-in element is screwed to the thread of the wheel hub, as a result of which the base can be fastened simply, securely and fixedly to the vehicle wheel.

A further embodiment is distinguished in that the actuating element has a screw element which is in the form, for example, of a threaded rod and is screwable to a thread of the propeller shaft, the thread being provided in order to secure the toothing engagement and also being referred to as a second thread. In other words, in order to secure the toothing engagement, a second screw, which is in the form, for example, of a collar screw, is screwed, for example, to the second thread of the propeller shaft, the thread being in the form, for example, of a second internal thread, in particular in such a manner that the second screw is screwed into the second thread of the propeller shaft. By this means, the wheel hub and therefore the second toothing are clamped against the propeller shaft and therefore against the first toothing, as a result of which the toothings are held in engagement with one another. This is undertaken, for example, in such a manner that the second screw is supported, in particular via its screwhead, in the axial direction of the wheel hub at least indirectly, in particular directly, on the wheel hub. In the completely manufactured state of the motor vehicle, for example, the second screw is covered by a wheel hub cover which is held on the vehicle wheel and which has, for example, an emblem for depicting a manufacturer of the motor vehicle. For example, the wheel hub cover is removed from the vehicle wheel in order to provide accessibility to the second screw. Subsequently, the second screw is released and removed from the second thread of the propeller shaft, in particular unscrewed from the propeller shaft or from a second thread. The screw element is then screwed to the second thread of the propeller shaft, in particular is screwed into the second thread of the propeller shaft. By this means, a force can be transmitted from the screw element to the propeller shaft, for example in the axial direction of the wheel hub. If, for example, the force mentioned is exerted on the actuating element and thereby on the screw element along the displacement direction, the actuating element and, in particular via the screw element of the actuating element, the propeller shaft, that is to say at least part of the propeller shaft, are thereby displaced in particular in the axial direction of the wheel hub or of the vehicle wheel relative to the wheel hub and relative to the vehicle wheel, as a result of which the toothing engagement is undone. By this means, the motor vehicle can be transferred particularly simply and in particular purely mechanically into its rollable state.

In a further refinement, a mounting aid for screwing the screw element to the thread of the propeller shaft is arranged on the screw element. Expressed in other words, the screw element can be subjected to a torque via the mounting aid, as a result of which the screw element is rotatable relative to the thread of the propeller shaft and can thereby be screwed into the thread of the propeller shaft. As a result, the screw element can be screwed particularly advantageously, in particular with particularly little effort, into the thread of the propeller shaft.

For example, the mounting aid is in the form of a rod element, in particular a T element. This can be understood as meaning in particular that the mounting aid has at least one rod-shaped part, in particular two rod-shaped parts, which part or which parts extends or extend in each case in the radial direction of the screw element and preferably protrude over the screw element in the radial direction. For example, the mounting aid can be arranged on the screw element, in particular can be pushed laterally therein. The mounting aid is preferably reversibly releasable from the screw element. Alternatively, the mounting aid can be held on the screw element so as to be able to be folded down or can be held on the screw element so as to be able to be unfolded from, and in particular folded into, the screw element. For example, the mounting aid is arranged or can be arranged at an axial end of the screw element.

In a further refinement, provision is made that, in the state of the base fastened to the vehicle wheel, the actuating element, in particular by subjecting the mounting aid to a force acting in the axial direction of the actuating element, is displaceable along the sliding direction relative to the base via the mounting aid in order, when the toothing engagement is undone, by displacement of the propeller shaft to bring about the toothing engagement between the first toothing and the second toothing, as a result of which the motor vehicle can be transferred into a non-rollable state. Expressed in other words, the displacement of the actuating element brought about via the mounting aid permits the displacement of the at least one part of the propeller shaft along the displacement direction in such a manner that, by displacement of the at least one part of the propeller shaft along the sliding direction, the toothing engagement can be brought about, and therefore the toothings engage in one another. This means in particular that, as a result of the actuating element being displaced along the sliding direction relative to the base, and preferably also relative to the vehicle wheel and relative to the wheel hub, at least part of the propeller shaft and, as a result, the first toothing are displaced along the displacement direction with respect to the second toothing, and therefore in particular with respect to the wheel hub, in such a manner that the toothing engagement is brought about. The mounting aid can therefore be designed in particular as a tightening aid for bringing about, that is to say for making, the toothing engagement. The propeller shaft can therefore be brought by means of the mounting aid into a starting position or a starting position status.

In order to be able to realize particularly simple handling of the tool and therefore to be able to produce the rollable state of the motor vehicle particularly simply, provision is made, in a further refinement of the invention, that the travel limiting device has an axial securing element which is supportable along the sliding direction at least indirectly on the base and which can be switched over between a release state and a blocking state. In the release state, the axial securing element is displaceable along the sliding direction relative to the actuating element. In the blocking state, relative movements along the sliding direction between the axial securing element and the actuating element are prevented, as a result of which, in the blocking state, the axial securing element can be displaced with the actuating element along the sliding direction relative to the base. It is therefore possible, in the release state, to displace and therefore to position the axial securing element along the sliding direction relative to the actuating element, consequently to slide same into an advantageous position from which, firstly, the toothing engagement can be undone, but, secondly, an excessively far displacement of the actuating element and therefore of the propeller shaft can be avoided. If, for example, the axial securing element is in the position mentioned, the axial securing element is adjusted or switched over from the release state into the blocking state. If then, starting from the position, for example the axial securing element is displaced relative to the vehicle wheel and is displaced here in the direction of the vehicle wheel, in particular along the sliding direction, the axial securing element carries along the actuating element such that (also) the actuating element is displaced along the sliding direction relative to the vehicle wheel and in particular also relative to the wheel hub. By this means, the actuating element slides at least part of the propeller shaft and in particular the first toothing of the propeller shaft away from the second toothing of the wheel hub, as a result of which the toothing engagement is undone. In this case, the axial securing element and therefore the actuating element can be slid along the sliding direction only to such an extent or such a length that the axial securing element comes into at least indirect, in particular direct, supporting contact with the base. In other words, whenever the axial securing element is in the blocking state, the axial securing element and, with the latter, the actuating element can be displaced from the previously mentioned position of the axial securing element along the sliding direction relative to the wheel hub and relative to the vehicle wheel only to such an extent or such a length that the axial securing element comes into at least indirect, in particular direct, supporting contact with the base. Accordingly, via the actuating element, the first toothing of the propeller shaft can be slid away from the second toothing of the wheel hub along the sliding direction only to such an extent or such a length that the axial securing element comes into at least indirect supporting contact with the base. By this means, an excessively far displacement of the actuating element and therefore of the propeller shaft can be avoided in a simple manner.

It has been shown to be particularly advantageous here if the axial securing element has a first supporting surface via which the axial securing element can be supported in a first direction, which coincides with the sliding direction and is also referred to as the first movement direction, at least indirectly, in particular directly, on a counter surface of the base. Therefore, for example, the axial securing element can be displaced from the previously mentioned position in the first direction relative to the base and therefore relative to the vehicle wheel only to such an extent or such a length that the first supporting surface comes into at least indirect supporting contact with the counter surface.

In particular, the tool can be fastened to the vehicle wheel in such a manner that relative movements along the sliding direction between the tool and the vehicle wheel and therefore between the tool and the wheel hub are stopped.

The axial securing element here preferably has a second supporting surface which faces away from the first supporting surface in a second direction coinciding with the sliding direction and opposed to the first direction, wherein the second direction is referred to simply also as the second movement direction. The first supporting surface preferably runs in a first plane, and the second supporting surface preferably runs in a second plane, the planes running perpendicularly to the sliding direction and being spaced apart from one another along the sliding direction. A particularly advantageous travel limitation of the actuating element can be provided in a particularly simple manner by the supporting surfaces.

A further embodiment is distinguished in that the travel limiting device has a guide element which is provided on the base and is immovable at least along the displacement direction relative to the base and which is designed, for example, as an alignment pin. The travel limiting device here has a travel limiting element which is displaceable in a manner guided along the sliding direction and along the guide element relative to the base, the axial securing element, the actuating element and the guide element between a first sliding position and a second sliding position. For example, a fit, in particular a clearance fit, is provided between the travel limiting element and the guide element, and therefore the travel limiting element can be displaced in a manner guided along the guide element, but excessive play and therefore excessive relative movements between the guide element and the travel limiting element are avoided. The sliding positions are preferably respective end positions of the travel limiting element which can be slid along the sliding direction and along the guide element from one of the end positions into the other end position and conversely from the other end position into the first end position, but not beyond the respective end position.

In the first sliding position, the travel limiting element is pivotable relative to the base, the axial securing element, the actuating element and the guide element between a first limiting position and a first release position. In the first limiting position, the axial securing element can be supported via the first supporting surface at least indirectly, in particular directly, on the travel limiting element, which, in the first limiting position, is at least partially arranged between the first supporting surface and the counter surface, such that then, for example, the axial securing element can be slid in particular in the direction of the vehicle wheel only to such a length or such an extent until the axial securing element comes via its first supporting surface into supporting contact with the travel limiting element.

In the first release position, the travel limiting element permits support of the axial securing element via the first supporting surface on the base, that is to say on the counter surface of the base. In other words, the axial securing element can then be slid in particular in the direction of the vehicle wheel to such a length or such an extent until the first supporting surface comes into at least indirect, in particular direct, supporting contact with the counter surface. For example, in the first release position, the travel limiting element is not arranged between the first supporting surface and the counter surface.

In the second sliding position, the travel limiting element is pivotable relative to the base, the axial securing element, the actuating element and the guide element between a second limiting position and a second release position. In the second limiting position, the axial securing element can be supported via the second supporting surface at least indirectly, in particular directly, on the travel limiting element, which is in the second limiting position, and therefore, for example, excessive displacement of the axial securing element and thus, for example, of the actuating element away from the vehicle wheel can be avoided. In the second release position, the second supporting surface is arranged without overlapping with the travel limiting element, as viewed in the second direction, and therefore, in the second release position, the second supporting surface, in particular the axial securing element as a whole, cannot be supported on the travel limiting element in the second direction. The travel limiting element permits particularly simple handling of the tool which in a simple manner limits the travel by which the axial securing element and, with the latter, the actuating element can be displaced in order to release the toothing engagement. This means that the travel limiting element permits displacement of the axial securing element and of the actuating element to the extent necessary to undo the toothing engagement, but the travel limiting element prevents excessively far displacement of the axial securing element and therefore of the actuating element and the propeller shaft. In addition, for example, the travel limiting element, after the toothing engagement has been undone, prevents an undesirable displacement of the axial securing element and, with the latter, of the actuating element away from the vehicle wheel, as a result of which it can be avoided that the undone toothing engagement is undesirably restored, for example, while the motor vehicle is being rolled and, for example, pushed. As a result, the tool can be handled particularly simply and safely.

It has been shown here to be particularly advantageous if a displacement path by which the travel limiting element is displaceable along the sliding direction and along the guide element is precisely the same size as a distance running along the sliding direction between the supporting surfaces, in particular between the previously mentioned planes. Firstly, the previously mentioned travel is thereby precisely specified, and therefore the axial securing element and, with the latter, the actuating element and the propeller shaft can be displaced sufficiently far in the first direction relative to the vehicle wheel and relative to the wheel hub in order to undo the toothing engagement, but wherein an excessively far displacement in the first direction is avoided. In addition, after the toothing engagement is undone, an undesirable displacement back of the axial securing element, and therefore of the actuating element and the propeller shaft, can be avoided, as a result of which it can be reliably avoided that the toothings come undesirably into engagement with one another again.

In a further embodiment, provision is made that the travel limiting device has a blocking element which can be arranged, in particular is arranged, in a receiving region of the base. Expressed in other words, the blocking element can be received, in particular is received, in the receiving region. The blocking element arranged in the receiving region is movable translationally relative to the base between a first position, in which the axial securing element is translationally movable relative to the base in the first direction, which coincides with the sliding direction, and a second position, in which the translational movement of the axial securing element in the first direction is stopped. Expressed in other words, the axial securing element, if the blocking element arranged in the receiving region is in the second position, is mechanically coupled to the blocking element in such a manner that the axial securing element is not movable in the first direction relative to the base, wherein the axial securing element, if the blocking element arranged in the receiving region is in the first position, is decoupled from the blocking element, as a result of which the axial securing element is movable relative to the base in the first direction.

For example, in the second position, the axial securing element can be supported, in particular via its first supporting surface, in particular directly, on the blocking element such that then, for example, the axial securing element can be slid in particular in the direction of the vehicle wheel only to such a length or such an extent until the axial securing element comes, in particular via its first supporting surface, into supporting contact with the blocking element. For example, in the second position, the blocking element is arranged between the first supporting surface and the counter surface.

In the first position, the blocking element permits, for example, direct support of the axial securing element on the base in particular via the first supporting surface, that is to say on the counter surface of the base, in particular bypassing the blocking element. In other words, the axial securing element can then be slid in particular in the direction of the vehicle wheel to such a length or such an extent until the first supporting surface comes into at least indirect, in particular direct, supporting contact with the counter surface of the base. For example, in the first position, the blocking element is not arranged between the first supporting surface and the counter surface.

For example, the blocking element is in the form of a latching element which is preferably designed to form a form fit with the axial securing element, and in particular to release the form fit. The blocking element is preferably movable between the positions in a direction which runs perpendicularly to the axial direction of the base and runs, for example, parallel to the radial direction of the base. In the first and the second position of the blocking element, the axial securing element is preferably movable relative to the base in the second direction, that is to say away from the vehicle wheel.

In a further refinement, provision is made that the base has a second receiving region which is spaced apart from the receiving region and in which a blocking element can be arranged, in particular is arranged. For example, the blocking element can be removed from the receiving region and arranged in the second receiving region. This means that the blocking element which can be arranged or is arranged in the second receiving region can be the blocking element which can be arranged or is arranged in the receiving region, which is referred to in particular as the first receiving region. Alternatively, the blocking element which can be arranged or is arranged in the second receiving region can be a second blocking element which is formed separately from the first blocking element. The second blocking element can be part of the travel limiting device.

The blocking element arranged in the second receiving region is translationally movable relative to the base between a first position, in which the axial securing element is translationally movable relative to the base in the second direction, which coincides with the sliding direction and is opposed to the first direction, and a second position, in which the translational movement of the axial securing element in the second direction is stopped. Expressed in other words, when the blocking element arranged in the second receiving region is in the second position, the axial securing element is mechanically coupled to the blocking element, in particular to the first or the second blocking element, in such a manner that the axial securing element is not movable relative to the base in the second direction, but if the blocking element arranged in the receiving region is in the first position, the axial securing element is decoupled from the blocking element, as a result of which the axial securing element is movable relative to the base in the second direction.

For example, the axial securing element can be supported via the second supporting surface at least indirectly, in particular directly, on the blocking element in the second position, in particular the first or the second blocking element, and therefore, for example, excessive displacement of the axial securing element and therefore, for example, of the actuating element away from the vehicle wheel can be avoided.

For example, in the first position, the second supporting surface is arranged without overlapping with the blocking element, in particular the first or the second blocking element, as viewed in the second direction, and therefore, in the first position, the second supporting surface, in particular the axial securing element as a whole, cannot be supported on the blocking element in the second direction.

The respective blocking element permits, for example, particularly simple handling of the tool which in a simple manner limits the travel by which the axial securing element and, with the latter, the actuating element can be displaced in order to release the toothing engagement. This means that the respective blocking element permits displacement of the axial securing element and of the actuating element to the extent necessary to undo the toothing engagement, but the respective blocking element prevents excessively far displacement of the axial securing element, and therefore of the actuating element and the propeller shaft. In addition, for example, after the toothing engagement has been undone, the blocking element prevents an undesirable displacement of the axial securing element and, with the latter, of the actuating element away from the vehicle wheel, as a result of which it can be avoided that the undone toothing engagement is undesirably restored, for example, while the motor vehicle is being rolled and, for example, pushed. As a result, the tool can be handled particularly simply and safely.

For example, the second blocking element is in the form of a latching element which is preferably designed to form a form fit with the axial securing element, and in particular to release the form fit. The first or the second blocking element is preferably movable between the positions in a direction which runs perpendicularly to the axial direction of the base and, for example, runs parallel to the radial direction of the base. In the first and the second position of the first or the second blocking element, the axial securing element is preferably movable relative to the base in the second direction, that is to say away from the vehicle wheel.

For example, the first and/or the second receiving region is designed as a respective passage opening arranged in the base.

In a further embodiment, provision is made that the travel limiting device has a lever element which is rotatable about an axis of rotation and is mechanically coupled to the axial securing element in such a manner that, when the lever element rotates in a direction of rotation, referred to in particular as the first direction of rotation, a translational movement of the axial securing element along the sliding direction relative to the base, in particular in the first direction, which coincides with the sliding direction, can be brought about. Expressed in other words, the axial securing element and, as a result, in particular the screw element can be slid or pushed, in particular in a defined manner, in the direction of the vehicle wheel by rotation of the lever element. As a result, the tool can be handled particularly simply, precisely and safely.

Provision is preferably made that the lever element is mechanically coupled to the axial securing element in such a manner that, when the lever element rotates in a second direction of rotation opposed to the first direction of rotation, a translational movement of the axial securing element relative to the base in the second direction, which coincides with the sliding direction and is opposed to the first direction, can be brought about.

Finally, it has been shown to be particularly advantageous if the base has a plastics element which is in the form, for example, of a plastics ring and via which the base can be supported, in particular directly, on the vehicle wheel. As a result, the tool can be fastened particularly simply to the vehicle wheel without damage, for example scratches, to the vehicle wheel occurring.

In a further refinement, provision is made that the base has a supporting region via which the base can be supported on a wheel suspension of the motor vehicle. As a result, the tool can be fastened particularly securely to the motor vehicle.

Provision is preferably made that, in the state fastened to the vehicle wheel, the base is supported in its radial direction on the wheel hub or on a rim of the motor vehicle. Expressed in other words, radial support, in particular radial securing of the base arranged in a passage opening can be brought about, the passage opening being formed by the rim or by the wheel hub, in particular a wheel bearing. The tool can thereby be held particularly securely on the vehicle wheel.

In a further embodiment, at least one securing element is provided for securing a screw connection against release of the screw connection which is formed by the screw element screwed into the thread of the propeller shaft. Expressed in other words, the securing element is provided for securing the screw connection, which is formed by the screw element screwed into the thread of the propeller shaft, against release of the screw connection. As a result, release of the screw connection, in particular upon rotation of the vehicle wheel, can be particularly reliably avoided.

A second aspect of the invention relates to a motor vehicle which is preferably in the form of a car, in particular a passenger car and which has a tool according to the first aspect of the invention. Advantages and advantageous refinements of the first aspect of the invention should be considered to be advantages and advantageous refinements of the second aspect of the invention, and vice versa.

A third aspect of the invention relates to the use of a tool according to the first aspect of the invention, wherein the tool is used to bring, that is to say to transfer, a motor vehicle into a rollable state of the motor vehicle despite a parking lock of the motor vehicle having been activated. Advantages and advantageous refinements of the first and second aspect of the invention should be considered to be advantages and advantageous refinements of the third aspect of the invention, and vice versa.

Further details of the invention emerge from the description below of a preferred exemplary embodiment together with the associated drawings.

Other objects, advantages and novel features of the present invention will become apparent from the following detailed description of one or more preferred embodiments when considered in conjunction with the accompanying drawings.

DETAILED DESCRIPTION OF THE DRAWINGS

In the figures, identical or functionally identical elements are provided with the same reference signs.

Figure 1:
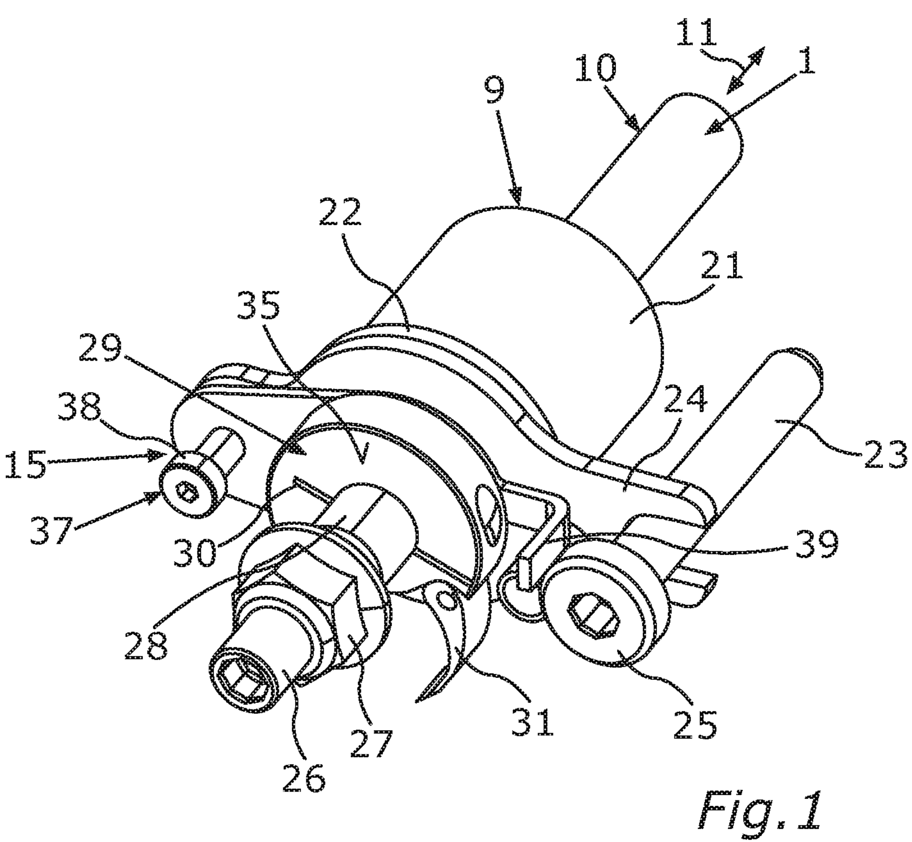
FIG. 1 shows a schematic perspective view of a tool for transferring a motor vehicle into a rollable state despite a parking lock of the motor vehicle having been activated.

FIG. 1 shows, in a schematic perspective view, a tool for transferring a motor vehicle, which is preferably in the form of a car, in particular a passenger car, into a rollable state of the motor vehicle despite a parking lock of the motor vehicle having been activated. The motor vehicle has at least or precisely two vehicle axles which are arranged one behind another in the longitudinal direction of the vehicle and are also simply referred to as axles. The respective vehicle axle has at least or precisely two vehicle wheels which are also simply referred to as wheels. The respective vehicle wheels of the respective vehicle axle are arranged on mutually opposite sides of the motor vehicle in the transverse direction of the vehicle. The motor vehicle, which is referred to simply also as vehicle, has a drive device, by means of which the vehicle wheels of at least or precisely one of the vehicle axles can be driven, and therefore, with respect to the vehicle wheels, precisely two of the vehicle wheels can be driven by means of the drive device, for example. The vehicle wheels which can be driven by means of the drive device are also referred to as drive wheels. The vehicle axle, the vehicle wheels of which can be driven by means of the drive device, is also referred to as drive axle, drivable axle or driven axle. The vehicle wheels are ground contact elements via which the motor vehicle is supported or can be supported downwardly in the vertical direction of the vehicle on the ground. If the motor vehicle is moved along the ground while the motor vehicle is downwardly supported in the vertical direction of the vehicle on the ground via the ground contact elements, the vehicle wheels roll on the ground. Driving of the drive wheels causes the motor vehicle to be driven. The drive axle has an axle drive which is also referred to as a differential or differential gear and via which the drive wheels can be driven by the drive device. The drive device can provide torques for driving the drive wheels. The respective torque which is provided or can be provided by the drive device is distributed or transmitted to the drive wheels by means of the axle drive, and therefore the drive wheels can be driven by the drive device via the axle drive. For example, when the motor vehicle drives through bends, the axle drive permits different rotational speeds of the drive wheels, in particular while the drive wheels are connected to the drive device via the axle drive so as to transmit torque or are drivable or are driven by the drive device, in particular in such a manner that the outer drive wheel on the bend rotates at a greater rotational speed than the inner drive wheel on the bend. For example, the axle drive is in the form of a bevel gear differential. The axle drive has an input gearwheel which, for example, is in the form of a ring gear. The input gearwheel meshes, for example, with a further gearwheel, which is in the form of a pinion or else is referred to as a pinion, of the drive device which can provide the respective torque via the second gearwheel. The respective torque which is provided or can be provided by the drive device via the further gearwheel can therefore be introduced into the axle drive via the input gearwheel, as a result of which the axle drive can be driven. The input gearwheel is connected, for example, for conjoint rotation to a base element of the axle drive, and therefore the input gearwheel and the base element are rotatable together about an input axis of rotation relative to a chassis of the motor vehicle, in particular if the input gearwheel and the base element are not secured nonrotatably on the chassis, that is to say are not secured against rotations about the input axis of rotation relative to the chassis. The input axis of rotation is also referred to as an input gearwheel axis of rotation. The chassis is, for example, a body of the motor vehicle which is in particular in the form of self-supporting bodywork, the interior of the motor vehicle being bounded, for example, by the body. By introduction of the respective torque into the axle drive, that is to say by transmission of the respective torque to the input gearwheel, the input gearwheel and, with the latter, the base element are driven and are therefore rotated about the input axis of rotation relative to the chassis, in particular whenever the input gearwheel and the base element are not secured nonrotatably on the chassis, that is to say are not secured against rotations about the input axis of rotation relative to the chassis.

The axle drive has compensating gearwheels which, for example, are in the form of first bevel gears. The compensating gearwheels are held on the base element in such a manner that the compensating gearwheels are rotatable together with the base element, and therefore with the input gearwheel, about the input axis of rotation relative to the chassis. In addition, the compensating gearwheels are held on the base element in such a manner that the compensating gearwheels are rotatable about a compensating axis of rotation relative to the base element and therefore relative to the input gearwheel and also relative to one another. The compensating axis of rotation, which is also referred to as compensating gearwheel axis of rotation, runs perpendicularly to the input axis of rotation. Furthermore, the axle drive comprises driven gearwheels which are held rotatably on the base element in such a manner that the driven gearwheels are rotatable about the input axis of rotation relative to the chassis. In addition, the driven gearwheels are rotatable about the input axis of rotation relative to the base element and relative to one another. In addition, the driven gearwheels mesh with the compensating gearwheels. For example, the driven gearwheels are in the form of second bevel gears. A first of the driven gearwheels is connected in a torque-transmitting manner to a first propeller shaft, which is also referred to as first side shaft. The second driven gearwheel is connected in a torque-transmitting manner to a second propeller shaft, which is also referred to as second side shaft. A first of the drive wheels can be driven by the first propeller shaft, that is to say by the first driven gearwheel via the first propeller shaft, and the second drive wheel can be driven by the second propeller shaft and therefore by the second driven gearwheel via the second propeller shaft.

For example, the base element is a cage which is also referred to as a differential cage, consequently is, for example, a housing or housing element which can at least partially surround the driven gearwheels and the compensating gearwheels. The first drive wheel is connected, for example, for conjoint rotation to a first wheel hub which can be mounted rotatably on a first wheel carrier of the motor vehicle, in particular via a first wheel bearing, which is in the form, for example, of a first rolling contact bearing. The second drive wheel is connected, for example, for conjoint rotation to a second wheel hub which is mounted, for example, rotatably on a second wheel carrier of the motor vehicle, in particular via a second wheel bearing, which can be entirely in the form in particular of a second rolling contact bearing. In this case, for example, the first propeller shaft is connected in a torque-transmitting manner to the first wheel hub such that the first wheel hub and, via the first wheel hub, the first drive wheel can be driven by the first propeller shaft. The second propeller shaft is connected in a torque-transmitting manner to the second wheel bearing such that the second wheel bearing and, via the second wheel bearing, the second drive wheel can be driven by the second propeller shaft. Driving of the respective drive wheel causes the respective drive wheel to be rotated relative to the respective wheel carrier. Since the first drive wheel is connected for conjoint rotation to the first wheel hub and can be driven by the first propeller shaft via the first wheel hub in such a manner that the first drive wheel is connected via the first wheel hub to the first propeller shaft in a torque-transmitting manner, the first drive wheel, the first wheel hub and the first propeller shaft belong together, and, consequently, the first propeller shaft belongs to the first drive wheel, and vice versa. Since the second drive wheel is connected for conjoint rotation to the second wheel hub and can be driven by the second propeller shaft via the second wheel hub, in particular in such a manner that the second drive wheel is connected via the second wheel hub in a torque-transmitting manner to the second propeller shaft, the second drive wheel, the second wheel hub and the second propeller shaft belong together, and, consequently, the second propeller shaft belongs to the second drive wheel, and vice versa.

The motor vehicle furthermore has the previously mentioned parking lock which is also referred to as a transmission lock and which is assigned to the axle drive. The parking lock is adjustable, that is to say can be switched over, between an engaged state and a disengaged state, wherein the engaged state is also referred to as an activated state and the disengaged state is also referred to as a deactivated state. If the parking lock is in the engaged state, consequently is in the activated state, the parking lock is activated, that is to say engaged. If the parking lock is in the disengaged state, consequently is in the deactivated state, the parking lock is deactivated, that is to say is disengaged. In the engaged state, the base element and therefore the input gearwheel are secured by means of the parking lock nonrotatably on the chassis, in particular bypassing the propeller shafts, and, consequently, are secured against rotations about the input axis of rotation relative to the chassis, and this is done preferably with a form fit. This should be understood as meaning in particular that, for example, a torque acting about the input axis of rotation can be transmitted by the base element or the input gearwheel via the parking lock to the chassis, in particular with a form fit, and can therefore be supported on the chassis or by means of the chassis without this torque on its path from the base element or the input gearwheel via the parking lock to the chassis running via one of the propeller shafts. Expressed again in other words, if, for example, via at least one of the propeller shafts, a torque acting about the input axis of rotation is transmitted to the axle drive or introduced into the axle drive such that the torque which is mentioned acts about the input axis of rotation and on the base element and therefore on the input gearwheel, whenever the parking lock is engaged, this torque is transmitted via the base element, and optionally via the input gearwheel, to the parking lock and via the parking lock to the chassis and is therefore supported on the chassis such that a rotation of the input gearwheel and of the base element running about the input axis of rotation and relative to the chassis is stopped. As a result, the propeller shafts and the drive wheels cannot be rotated relative to the chassis, and therefore, whenever the parking lock is engaged, the motor vehicle is secured against undesirable rolling or rolling away. In the engaged state, the parking lock interacts, for example, directly with the input gearwheel or directly with the base element, but not directly with one of the propeller shafts. If, for example, the motor vehicle is therefore raised in such a manner that the drive wheels are no longer in contact with the ground, but rather, as it were, float in the air while the parking lock is in the engaged state, then, for example, the first drive wheel can be rotated in a first direction of rotation relative to the chassis. By rotation of the first drive wheel in the first direction of rotation, the first propeller shaft is, as it were, driven by the first drive wheel and therefore, as it were, rotated in the first direction of rotation relative to the chassis. This causes the first driven gearwheel and, via the first driven gearwheel, the compensating gearwheels to be driven which, as a result, drive the second driven gearwheel and, via the second driven gearwheel, the second propeller shaft and, via the second propeller shaft, the second drive wheel in such a manner that the second drive wheel and the second propeller shaft rotate in the opposite direction to the first drive wheel and to the first propeller shaft, and, consequently, the second drive wheel and, with the latter, the second propeller shaft are rotated in a second direction of rotation opposed to the first direction of rotation. In its engaged state, the parking lock therefore permits rotations of the compensating gearwheels about the compensating axis of rotation relative to the base element and rotations of the driven gearwheels about the input axis of rotation relative to the base element. This construction or this design of the axle drive and of the parking lock now makes use of the tool which is shown in FIG. 1 and is denoted by 1. FIGS. 3 to 11 show, for example, the previously mentioned first drive wheel which is denoted by 2 and which has a rim 3 and a tire 4 pulled onto the rim 3.

Figure 13:
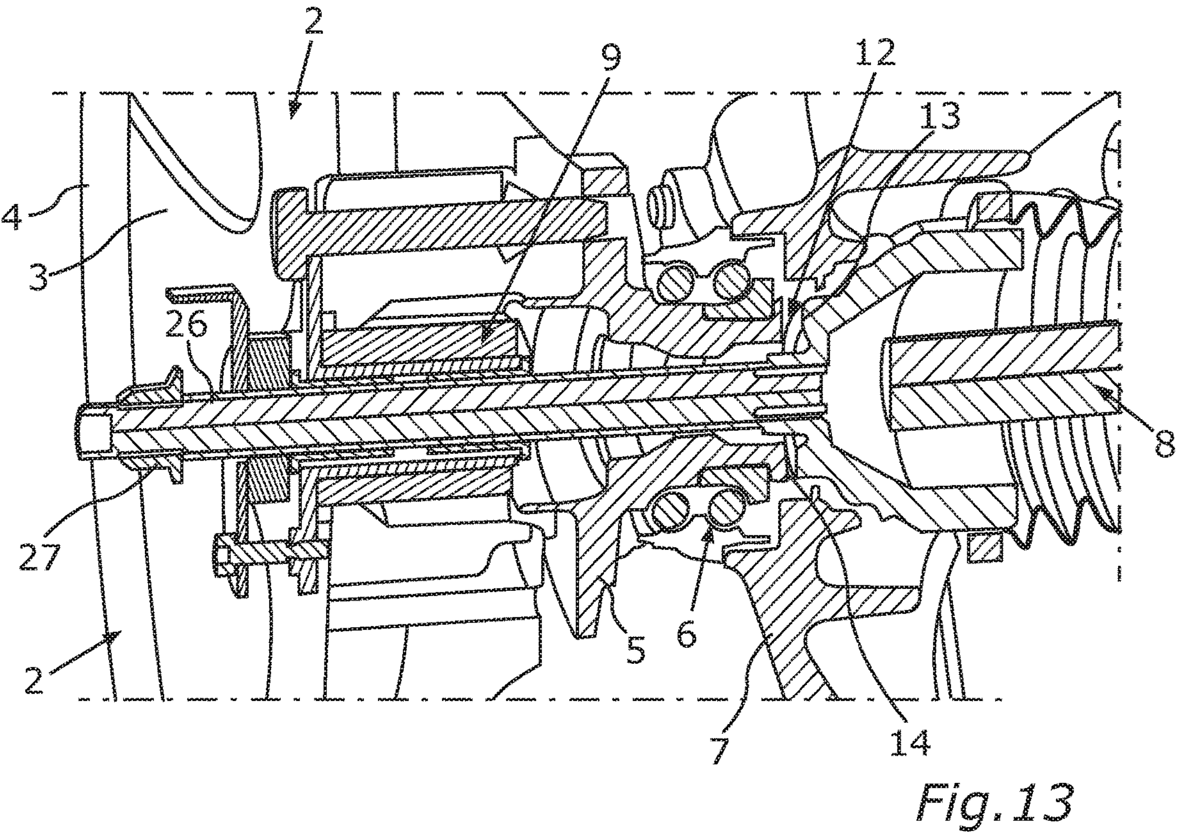
FIG. 13 shows a partial schematic and sectioned perspective view of the vehicle wheel and an associated propeller shaft.

The first wheel hub, denoted by 5, can be seen in FIG. 13. In addition, the first wheel bearing, denoted by 6, and the first wheel carrier, denoted by 7, can be seen in FIG. 13. Furthermore, the first propeller shaft, denoted by 8, can be seen in FIG. 13. The respective propeller shaft has, for example, in particular precisely two joints which are in the form in particular of what are referred to as tripod joints. The joints and therefore the respective propeller shaft permit compression and rebound movements of the respective drive wheel relative to the chassis in particular in the vertical direction of the vehicle. As will be explained more precisely below, the tool 1 has a base 9, which is fastenable to the drive wheel 2, and an actuating element 10, which is displaceable relative to the base 9 along a sliding direction, depicted by a double arrow 11. In the state of the tool 1 fastened to the drive wheel 2, the sliding direction coincides with the axial direction of the drive wheel 2. As will be explained more precisely below, by displacement of the actuating element 10 along the sliding direction relative to the base 9, displacing the propeller shaft 8, a toothing engagement 12 between a first toothing 13 of the propeller shaft 8 and a second toothing 14 of the wheel hub 5 can be undone, as a result of which the motor vehicle can be transferred, that is to say can be brought, into its rollable state. In addition, the tool 1 comprises a travel limiting device 15 which can specify or specifies a travel, that is to say in a definable or defined manner, by which the actuating element 10 is displaceable at maximum relative to the base 9 along the sliding direction in order to undo the toothing engagement 12.

Figures 3, 4:
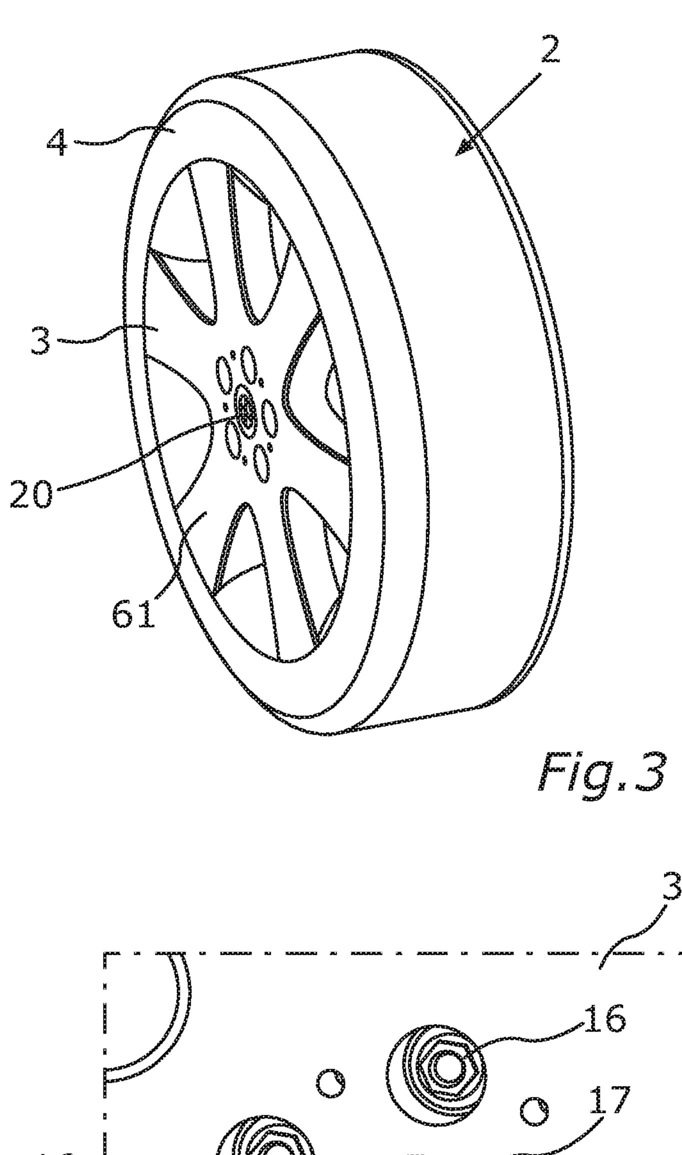
FIG. 3 shows a schematic perspective view of a vehicle wheel of the motor vehicle.
FIG. 4 shows a partial schematic perspective view of the vehicle wheel.

As can be seen from FIG. 4, the drive wheel 2 is connected for conjoint rotation to the associated wheel hub 5 by means of a plurality of wheel screws 16 in such a manner that the respective wheel screw 16 is screwed into a respective, corresponding thread of the wheel hub 5. In addition, the toothing engagement 12 is initially secured by means of a screw element, which is in the form here of a collar screw 17, in such a manner that the collar screw 17 is screwed into a corresponding thread, in particular in the form of an internal thread, of the propeller shaft 8. For this purpose, the collar screw 17 has, for example, a shaft with a thread of the collar screw 17. The thread of the collar screw 17 is screwed to the thread of the propeller shaft 8, as a result of which the collar screw 17 is clamped via its screwhead 18 against the wheel hub 5, in particular in the axial direction of the wheel hub 5. The axial direction of the wheel hub 5 coincides with the axial direction of the drive wheel 2. By this means, the wheel hub 5 is clamped against the propeller shaft 8, as a result of which the toothings 13 and 14 are kept in engagement with one another. By this means, the toothing engagement 12 is secured.

It can be seen from FIG. 3 that the drive wheel 2, in particular the rim 3, has a central passage opening 19 (FIG. 4) which is closed, in particular completely, by means of a wheel hub cover 20. The wheel hub cover 20 is formed separately from the rim 3 and is held on the rim 3, in particular reversibly, that is to say so as to be releasable without being destroyed.

Figure 5:
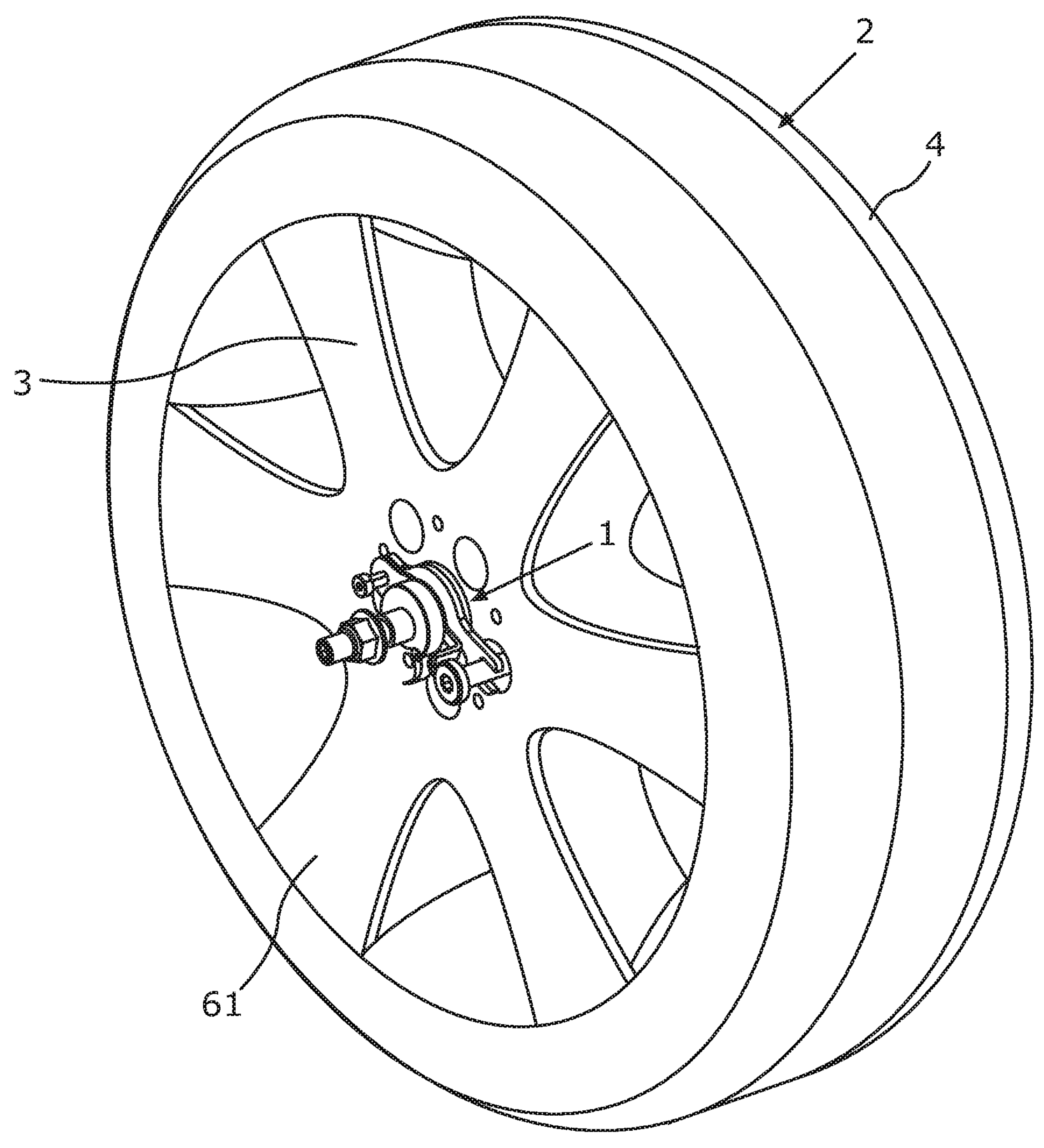
FIG. 5 shows a further schematic perspective view of the vehicle wheel to which the tool is fastened.

As can be seen from FIGS. 3 and 4, for example, first of all the wheel hub cover 20 is released from the rim 3 and removed in order thereby to expose the passage opening 19. In addition, one of the wheel screws 16 is released and removed. Furthermore, for example, the collar screw 17 is released and removed. All this takes place, for example, while the motor vehicle is downwardly supported in the vertical direction of the vehicle via its vehicle wheels on the ground. Subsequently, for example, as can be seen in FIG. 5, the tool 1 is fastened by means of its base 9 to the drive wheel 2. For this purpose, for example, the base 9 is inserted for a distance into the central passage opening 19 such that the base 9 is supported, in particular via a plastics sleeve 21 of the base 9, on an inner circumference of the passage opening 19. The base 9 furthermore has a plastics element which is in the form here of a plastics ring 22 and is formed from a plastic. The base 9 is supported on the rim 3 via the plastics ring 22 in the axial direction of the drive wheel 2, in particular in such a manner that the plastics ring 22 lies directly on the rim 3. This avoids damage to the rim 3. The base 9 is therefore inserted into the passage opening 19 in the axial direction of the drive wheel 2, and therefore along the sliding direction, to such an extent or to such a length until the plastics ring 22, and therefore the base 9, come into, in particular direct, supporting contact with the drive wheel 2.

Figure 2:
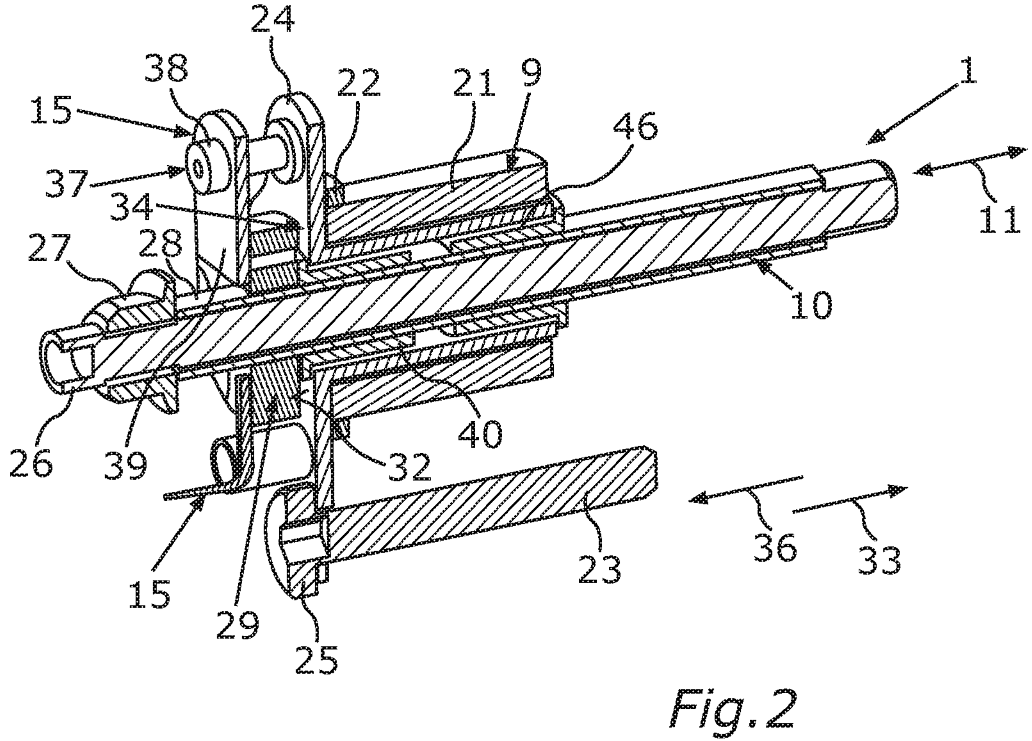
FIG. 2 shows a schematic and sectioned perspective view of the tool.

As can be seen particularly readily from FIGS. 1 and 2, the base 9 has a screw-in element 23 and, for example, a base element 24. For example, the screw-in element 23 is held rotatably on the base element 24. First of all, the respective wheel screw 16 is screwed into the respective thread of the wheel hub 5 and therefore screwed to the respective thread of the wheel hub 5, the respective thread of the wheel hub 5 also being referred to as the wheel hub thread. Since one of the wheel screws 16 is released and removed, one of the wheel hub threads becomes free as a result, with the screw-in element 23 being screwed into the wheel hub thread which has become free and therefore screwed to the wheel hub thread which has become free, as a result of which the base 9 is fastened to the drive wheel 2. For this purpose, the screw-in element 23 is rotated relative to the base element 24 about a screw axis of rotation which runs parallel to the sliding axis. For example, the screw-in element 23 is screwed to the wheel hub thread which has become free or is screwed into the wheel hub thread which has become free until the screw-in element 23 is supported via its screwhead 25 on the base element 24 and the base 9 comes via its plastics ring 22 into, in particular direct, supporting contact with the rim 3.

As can be seen particularly readily from FIGS. 1, 2, 6 and 7, the actuating element 10 has a screw element which is in the form here of a threaded rod 26 and is screwed to the thread of the propeller shaft 8, the thread being provided for securing the toothing engagement 12, consequently is screwed into the thread of the propeller shaft 8, the thread being provided for securing the toothing engagement 12. This is possible since the collar screw 17 has been removed beforehand. In the exemplary embodiment shown in the figures, the actuating element 10 also has a lock nut 27, which is screwed onto the threaded rod 26, and a sleeve 28 which is arranged on the threaded rod 26, in particular in such a manner that the threaded rod 26 completely penetrates the sleeve 28. For example, the sleeve 28 is formed from a plastic. After the threaded rod 26 has been screwed into the thread of the propeller shaft 8, the threaded rod 26 is locked against the sleeve 28 with the aid of the lock nut 27 in such a manner that the lock nut 27 is screwed on the threaded rod 26 against the sleeve 28, consequently is rotated relative to the threaded rod 26 until the lock nut 27 comes into supporting contact with the sleeve 28, in particular as viewed along the sliding direction.

The travel limiting device 15 has an axial securing element 29 which can be supported at least indirectly on the base 9 along the sliding direction and can be switched over between a release state and a blocking state. For this purpose, the axial securing element 29 has a main body 30 which is arranged on the sleeve 28 and therefore on the actuating element 10. In addition, the axial securing element 29 has a clamp 31 which is held movably, in particular pivotably, on the main body 30. The clamp 31 is movable, in particular pivotable, relative to the main body 30 between at least one unblocking position and at least one blocking position. In the unblocking position of the clamp 31, the release state of the axial securing element 29 is produced, that is to say brought about, and, in the blocking position, the blocking state of the axial securing element 29 is produced, that is to say brought about. In the release state, the axial securing element 29 is displaceable along the sliding direction relative to the actuating element 10 and, in the process, on the sleeve 28. However, in the blocking state, relative movements along the sliding direction between the axial securing element 29 and the actuating element 10 are prevented, as a result of which, in the blocking state, the axial securing element 29 is displaceable together with the actuating element 10 along the sliding direction (double arrow 11) relative to the base 9. The axial securing element 29 here has a first supporting surface 32 via which the axial securing element 29 can be supported on a counter surface 34 of the base 9, in particular of the base element 24, in a first direction, which coincides with the sliding direction and is depicted by an arrow 33. Furthermore, the axial securing element 29 has a second supporting surface 35 which faces away from the first supporting surface 32 in a second direction, which coincides with the sliding direction, is opposite the first direction and is depicted by an arrow 36. The travel limiting device 15 has a guide element 37 which is provided, in particular held, on the base 9, in particular on the base element 24, in such a manner that the guide element 37 is immovable relative to the base 9 at least along the sliding direction. In other words, the guide element 37 cannot be displaced relative to the base 9 along the sliding direction. In the exemplary embodiment shown in the figures, the guide element 37 is an alignment pin which has a head 38. In addition, the travel limiting device 15 has a travel limiting element which is in the form here of a clamp 39 and is displaceable along the sliding direction in a manner guided along the guide element 37 relative to the base 9, relative to the axial securing element 29, relative to the actuating element 10 and relative to the guide element 37 between a first sliding position and a second sliding position. In FIG. 1, the clamp 39 is in the first sliding position, and, in FIG. 2, the clamp 39 is in the second sliding position. In the first sliding position, the clamp 39 is pivotable relative to the base 9, relative to the axial securing element 29, relative to the actuating element 10 and relative to the guide element 37 between a first limiting position, shown in FIG. 1, and a first release position, in particular about a pivot axis running parallel to the sliding direction. In the first limiting position, the axial securing element 29 can be supported or is supported via its first supporting surface 32 on the clamp 39, which is arranged between the first supporting surface 32 and the counter surface 34 in the first limiting position, as is shown in FIG. 1. In the first release position, the clamp 39 is not arranged between the counter surface 34 and the supporting surface 32, and therefore the axial securing element 29 can be supported via its supporting surface 32, in particular directly, on the counter surface 34 and therefore, in particular directly, on the base 9. It is conceivable in principle for the counter surface 34 to be formed by the base element 24. However, in the exemplary embodiment shown in the figures, the counter surface 34 is formed by a sliding sleeve 40 of the base 9. The counter surface 34 is a surface of the base 9, on which the axial securing element 29 can be supported or is supported, in particular directly, via the supporting surface 32, in particular if the clamp 39 is in the first release position. The sliding sleeve 40, which is also simply referred to as sleeve, and an additional second sliding sleeve 46, also simply referred to as second sleeve, firstly permit the actuating element 10 to be able to be displaced with little friction and therefore simply relative to the base 9 in order to release the toothing engagement 12. The actuating element 10 is therefore mounted, in particular mounted in a sliding manner, on the base 9 via the sliding sleeves 40 and 46 so as to be displaceable along the sliding direction relative to the base 9. On the other hand or secondly, for example, the threaded rod 26 and, with the latter, the lock nut 27 can advantageously rotate relative to the base 9 and to the travel limiting device 15, in particular relative to the sleeve 28, with the sleeve 28, for example, ensuring such a relative rotation between the threaded rod 26 and the base 9.

In the second sliding position, the clamp 39 is pivotable about the pivot axis relative to the base 9, relative to the axial securing element 29, relative to the actuating element 10 and relative to the guide element 37 between a second limiting position, shown in FIG. 2, and a second release position. In the second limiting position, the axial securing element 29 can be supported via its second supporting surface 35, in particular directly, on the clamp 39 (travel limiting element), which is in the second limiting position, in particular by, in the second limiting position, the supporting surface 35 being at least partially overlapped or covered by the clamp 39 in the second direction (arrow 36). In the second release position, the second supporting surface 35 is arranged without overlapping with the clamp 39 (travel limiting element), as viewed in the second direction (arrow 36), and therefore then, for example, the axial securing element 29 can be displaced in the second direction to such an extent or to such a length relative to the actuating element 10, and also relative to the clamp 39, that the supporting surface 35 is spaced apart further from the counter surface 34 of the base 9 than the clamp 39, as viewed along the sliding direction.

In the exemplary embodiment shown in the figures, a displacement travel by which the clamp 39 is displaceable along the guide element 37 and along the sliding direction is precisely the same size as a distance running along the sliding direction between the supporting surfaces 32 and 35 of the axial securing element 29. This results in an effect which will be described below.

Figure 6:
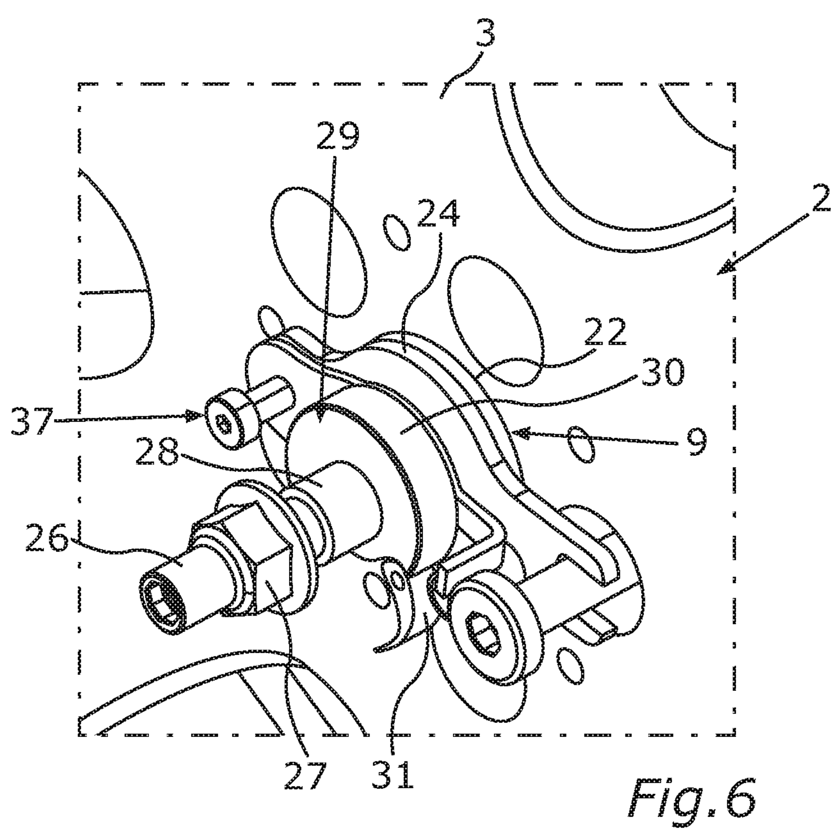
FIG. 6 shows a partial schematic perspective view of an arrangement of the tool on the vehicle wheel according to FIG. 5.
Figure 7:
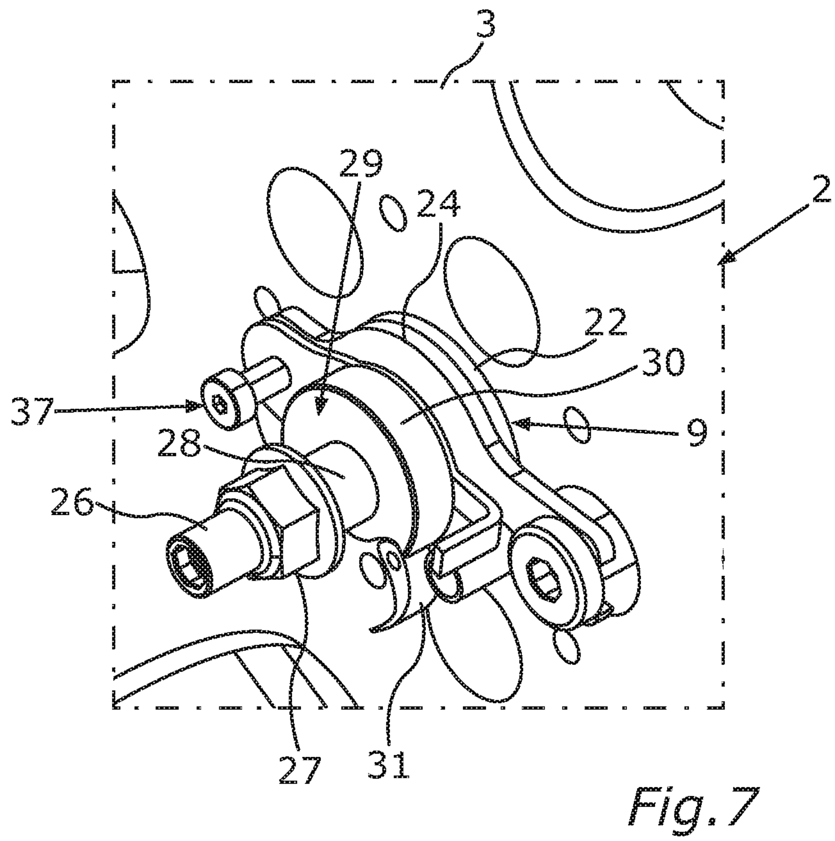
FIG. 7 shows a further schematic perspective view of the arrangement according to FIG. 6.
Figure 8:
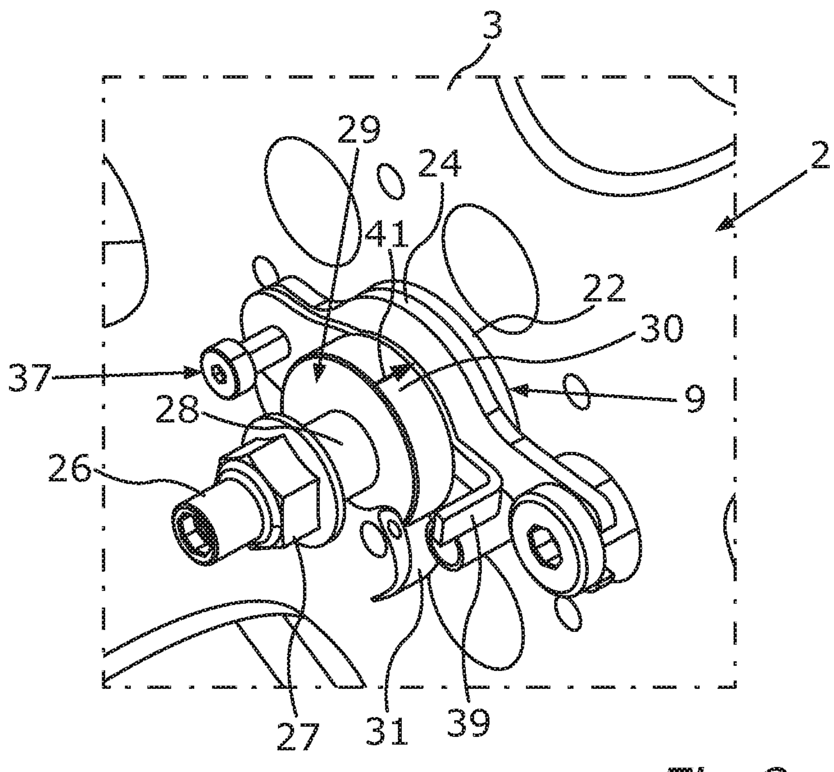
FIG. 8 shows a further schematic perspective view of the arrangement according to FIGS. 6 and 7.
Figure 9:
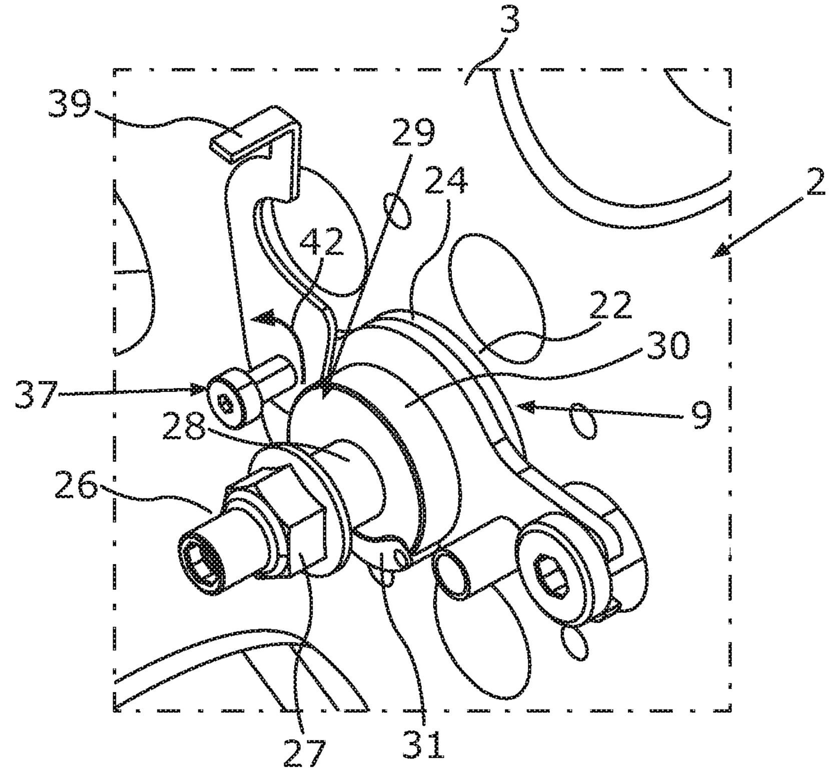
FIG. 9 shows a further schematic perspective view of the arrangement according to FIGS. 6 to 8.
Figure 10:
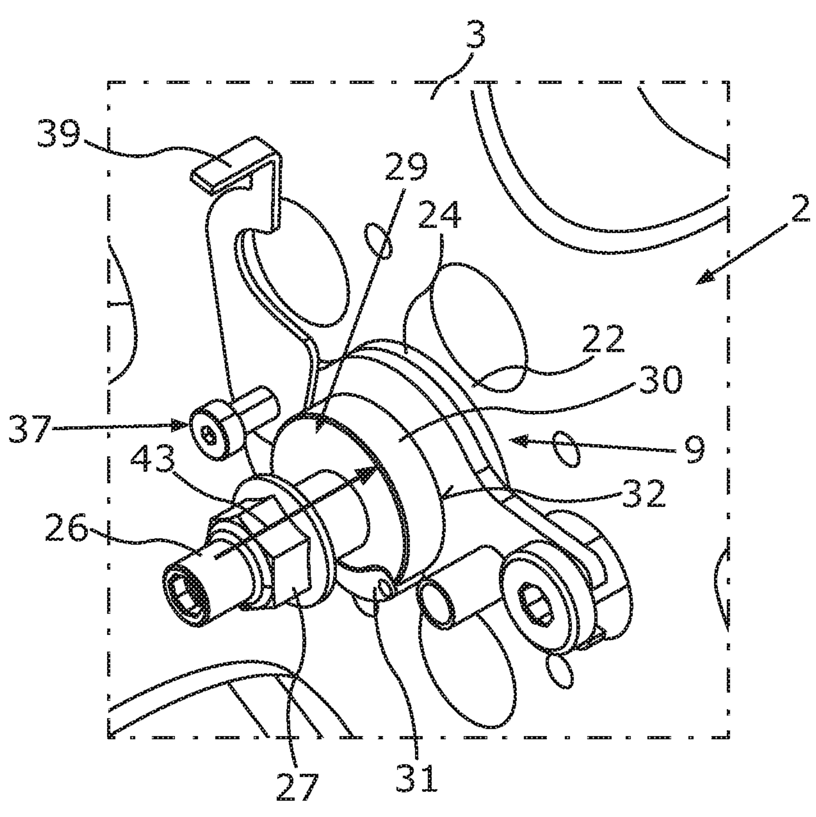
FIG. 10 shows a further schematic perspective view of the arrangement.
Figure 11:
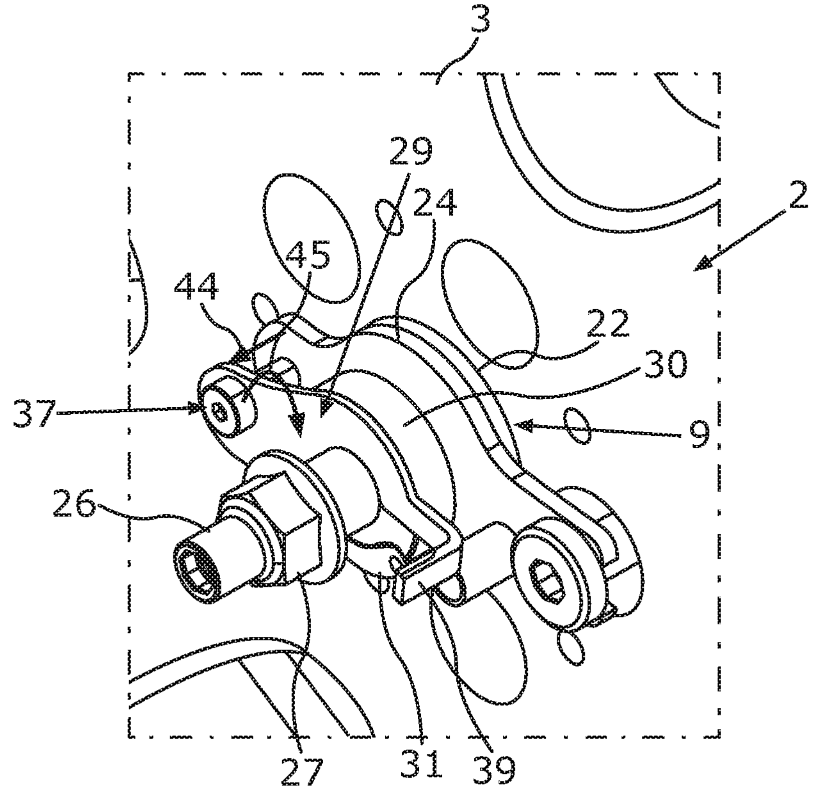
FIG. 11 shows a further schematic perspective view of the arrangement.

As can be seen in FIGS. 5 and 6, the tool 1 is first of all set in such a manner that the clamp 39 is in the first sliding position and in the first limiting position and that the axial securing element 29 is supported via its supporting surface 32 directly on the clamp 39. The clamp 39 in this case, whenever it is in the first sliding position and in the first limiting position, is supported on one side directly on the base 9 and on the other side directly on the axial securing element 29, in particular on the supporting surface 32. In addition, the lock nut 27 is screwed against the sleeve 28, and the tool 1 is fastened to the drive wheel 2 via the base 9. The axial securing element 29 is initially in its release state, in particular owing to the clamp 31 being in its unblocking position. The clamp 31 is then moved into its blocking position, as a result of which the axial securing element 29 is transferred into its blocking state. As depicted in FIG. 8 by an arrow 41, while the axial securing element 29 is in its release state, the axial securing element 29 is moved in the direction of the drive wheel 2 and, in the process, along the sliding direction and is thereby moved via its supporting surface 32 into direct supporting contact with the clamp 39 which is in the first sliding position and in the first limiting position. Subsequently, as can be seen in FIG. 9, the clamp 31 is moved into its blocking position. In addition, as is shown in FIG. 9 by an arrow 42, the clamp 39 is moved out of the first limiting position into the first release position while it is in the first sliding position. Then, as shown in FIG. 10 and depicted by an arrow 43, the axial securing element 29 and, with the latter, the actuating element 10 are displaced along the sliding direction relative to the base 9 in such a manner, while the clamp 39 is in the first sliding position and in the first release position, until the axial securing element 29 comes via its first supporting surface 32 into, in particular direct, supporting contact with the base 9 and, in the process, in particular with the counter surface 34. Subsequently, the clamp 39 is displaced out of the first sliding position and out of the first release position along the guide element 37 until the clamp 39 comes into its second sliding position and into its second release position. While the clamp 39 is in the second sliding position, the clamp 39 is pivoted from the second release position into the second limiting position, this being depicted in FIG. 11 by arrows 44 and 45. Arrow 44 shows that the clamp 39 is displaced from the first sliding position and the first release position into the second sliding position and the second release position. Arrow 45 shows that the clamp 39, while being in the second sliding position, is pivoted from the second release position into the second securing position, and therefore the clamp 39 according to FIG. 11 is in the second sliding position and in the second limiting position. Owing to the previously described displacement travel, the axial securing element 29 is now supported in the second direction via the second supporting surface 35 directly on the clamp 39, which is in the second sliding position and in the second limiting position, such that undesirable displacements of the actuating element 10 in the second direction relative to the base 9 are avoided.

Since the actuating element 10, as depicted by arrow 43 in FIG. 10, is displaced in the first direction relative to the base 9 after the clamp 39 has been moved from the first limiting position into the first release position, and since the actuating element 10 has been connected to the propeller shaft 8 via the threaded rod 26, at least part of the propeller shaft 8 is displaced in the first direction relative to the base 9 in such a manner that the toothing 13 is moved away, in particular slid away, from the toothing 14. By this means, the toothing engagement 12 is undone. This means that, as a result of the toothing engagement 12 being undone, the toothings 13 and 14 are no longer in engagement with one another, and therefore the wheel hub 5 is no longer connected to the propeller shaft 8 in a torque-transmitting manner. As a result, the drive wheels can be rotated in the same direction of rotation relative to the chassis although the parking lock has been activated and although the motor vehicle is downwardly supported in the vertical direction of the vehicle via its vehicle wheels on the ground, that is to say although the drive wheels are in contact with the ground. The motor vehicle is therefore in its rollable state. If the toothing engagement 12 has been undone in the described manner, it is possible to rotate the drive wheels standing on the ground in the same direction of rotation relative to the chassis such that the drive wheels rotate in the same direction relative to the chassis, but such that the propeller shaft 8 and the drive wheel 2 rotate in the opposite direction. In other words, after the toothing engagement 12 is undone, both the first drive wheel and the second drive wheel are rotated simultaneously, for example, in the first direction of rotation, and so, by this means, so to say also the second wheel hub and the second propeller shaft are rotated in the first direction of rotation, and also the wheel hub 5 is rotated in the first direction of rotation relative to the chassis. Since, however, the parking lock has been activated, the first propeller shaft 8 and the first drive gearwheel, via the compensating wheels, and the second drive gearwheel are driven by the second propeller shaft and the second drive wheel in such a manner that the first propeller shaft 8 and, with the latter, the first drive gearwheel rotate in the opposite direction to the first drive wheel 2 and therefore in the second direction of rotation. This is possible, however, since the propeller shaft 8 is therefore no longer connected in a torque-transmitting manner to the drive wheel 2, and the toothing engagement 12 has been previously undone by the fact that the propeller shaft 8, that is to say at least part of the propeller shaft 8, has been displaced along the sliding direction by means of the actuating element 10, specifically in such a manner that the toothing engagement 12 has been released. The mentioned part of the propeller shaft 8 comprises, for example, the toothing 13. In addition, the threaded rod 26 and the lock nut 27 rotate together with the propeller shaft 8, and the base 9 and, for example, also the travel limiting device 15 rotate together with the drive wheel 2 such that the lock nut 27 and the threaded rod 26 rotate in the second direction of rotation while the base 9 and, for example, the travel limiting device 15 rotate in the opposite direction thereto and therefore in the first direction of rotation.

Since the clamp 39 is initially in the first sliding position and in the first limiting position, and since the axial securing element 29 is initially supported via its supporting surface 32 directly on the clamp 39, after the clamp 39 has been moved into the first release position the axial securing element 29 and, with the latter, the actuating element 10 can be displaced only to an extent until the supporting surfaces 32 come into direct supporting contact with the counter surface 34. A displacement going beyond the latter and therefore being excessively far of the propeller shaft 8 or of the toothing 13 away from the corresponding toothing 14 is not possible, and therefore damage and excess soiling can be avoided. Furthermore, the clamp 39 in the second sliding position and in the second limiting position prevents the actuating element 10 and, with the latter, the propeller shaft 8 from being undesirably displaced back while, for example, the motor vehicle is being rolled, and therefore, for example, it is avoided that the toothings 13 and 14 come into engagement with one another again while the motor vehicle is being rolled. By this means, particularly safe handling of the tool 1 is possible.

Figure 12:
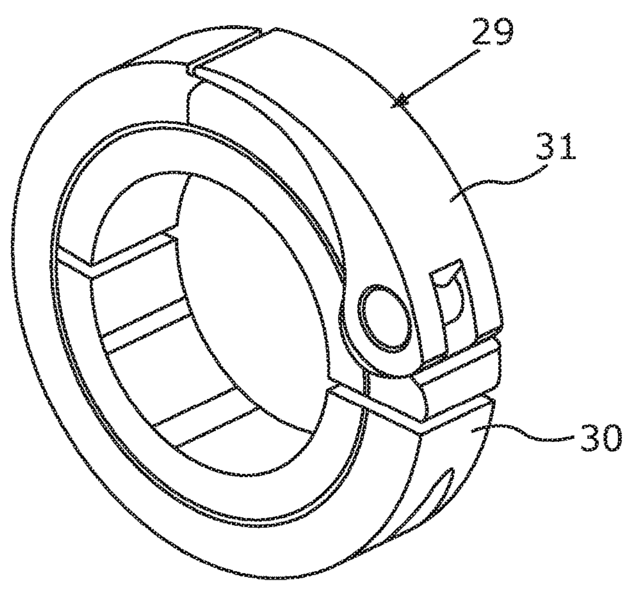
FIG. 12 shows a schematic perspective view of an axial securing element of the tool.

FIG. 12 shows the axial securing element 29 in a schematic perspective view. The main body 30 and the clamp 31 of the axial securing element 29 can be seen particularly readily from FIG. 12.

Figure 14:
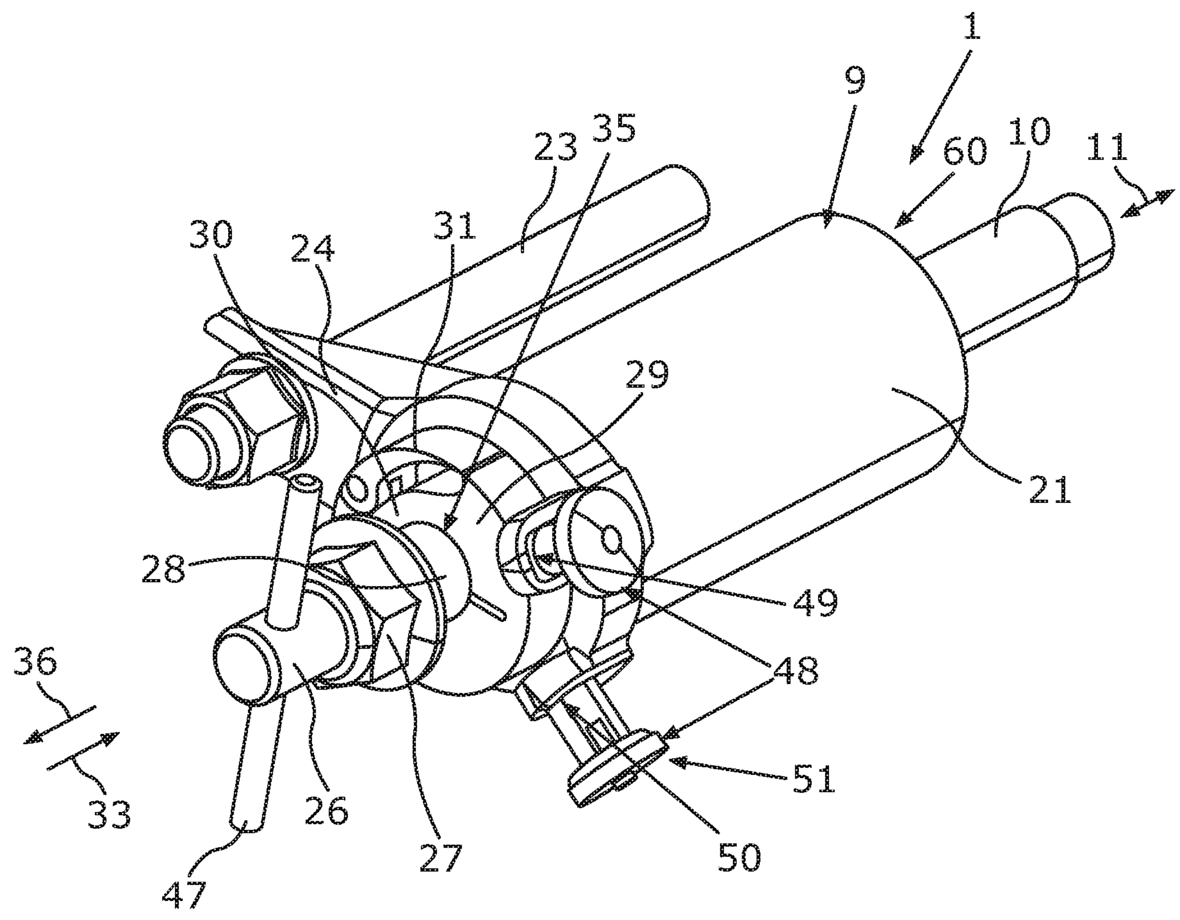
FIG. 14 shows a schematic perspective view of the tool according to a further embodiment.

FIG. 14 shows, in a schematic perspective view, the tool 1 according to a further embodiment in which a mounting aid 47 for screwing the screw element 26 to the thread of the propeller shaft 8 is arranged on the screw element 26. Provision is preferably made that, in a state of the base 9 fastened to the vehicle wheel 2, the actuating element 10 is displaceable via the mounting aid 47 along the sliding direction 11, in particular in the second direction 36, relative to the base 9 in order, when the toothing engagement 12 is undone, to bring about, by displacement of the propeller shaft, in particular in the second direction 36, the toothing engagement 12 between the first toothing 13 and the second toothing 14, as a result of which the motor vehicle can be transferred into a non-rollable state.

As shown in FIG. 14, it is provided, in a further refinement, that the travel limiting device 15 has at least one blocking element 48 which is referred to in particular as first blocking element 48 and can be arranged in a receiving region 49, referred to in particular as first receiving region 49, of the base 9. The first blocking element 48, which is arranged in the receiving region 49, is translationally movable relative to the base 9 between at least a first position and at least a second position, wherein, in the first position, the axial securing element 29, which is in particular spaced apart from the counter surface 34, is translationally movable relative to the base 9 in the first direction 33, which coincides with the sliding direction 11, and, in the second position, the translational movement of the axial securing element 29, which is in particular spaced apart from the counter surface 34, in the first direction 33 is stopped. As a result, a distance which can be, for example, 3 millimeters between the axial securing element 29 and the counter surface 34 can be ensured by means of the first blocking element 48, in particular before the screw element 26 is pushed into the sleeve 28 or into the thread of the propeller shaft 8. The axial securing element 29 can therefore be held particularly securely.

Provision is preferably made that the base 9 has a second receiving region 50 which is spaced apart from the receiving region and in which a blocking element 48, 51 can be arranged, which can be the first blocking element 48 or a second blocking element 51 formed separately from the first blocking element 48. The respective blocking element 48, 51 arranged in the second receiving region 50 is translationally movable relative to the base 9 between a first position and a second position. In the first position, the axial securing element 29 is translationally movable relative to the base 9 in the second direction 36, which coincides with the sliding direction 11 and is opposed to the first direction 33, and, in the second position, the translational movement of the axial securing element 29 in the second direction 36 is stopped. As a result, the axial securing element 28 can be particularly securely held by means of the respective blocking element 48, 51, in particular if the screw element 26 is pushed into the sleeve 28 or into the thread of the propeller shaft 8.

Figure 15:
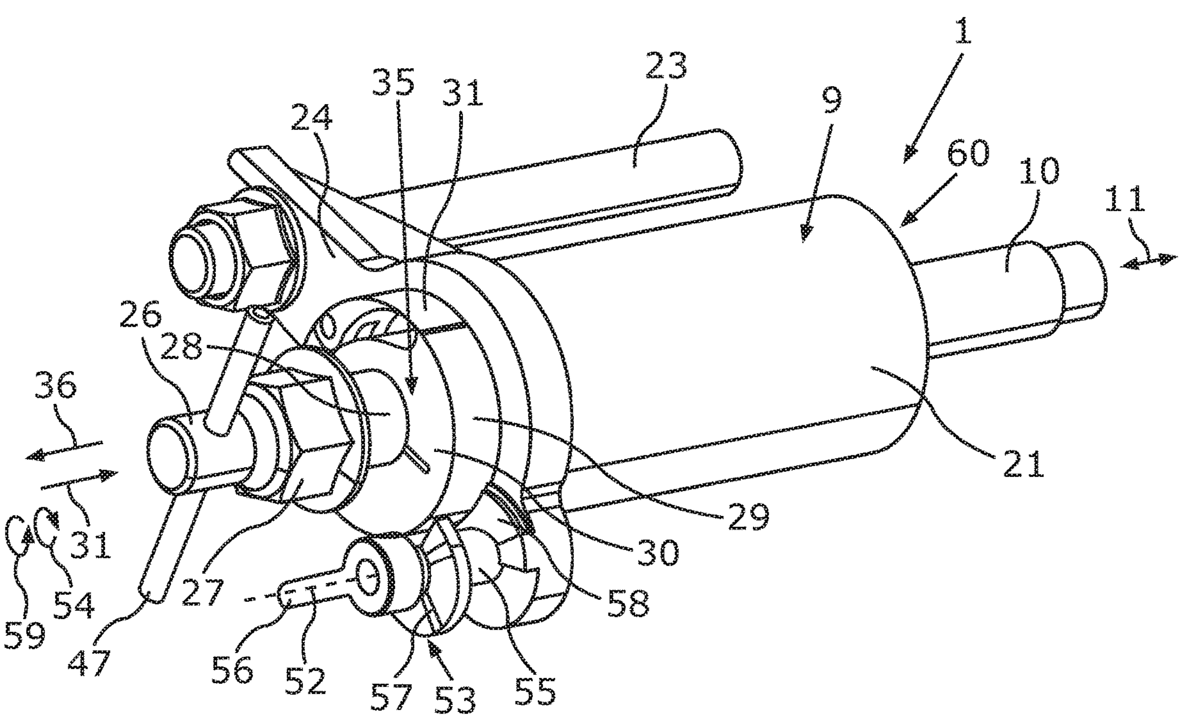
FIG. 15 shows a schematic perspective view of the tool according to a further embodiment with a lever element in a first rotational position.

FIG. 15 shows, in a schematic perspective view, the tool 1 according to a further embodiment in which the travel limiting device 15 has a lever element 53 which is rotatable about an axis of rotation 52 and is mechanically coupled to the axial securing element 29 in such a manner that, when the lever element 53 is rotated in a direction of rotation 54, which is referred to in particular as first direction of rotation 54, a translational movement of the axial securing element 29 relative to the base 9 along the sliding direction 11, in particular in the first direction 33, can be brought about. The lever element 53 has a main body 55 and a lever part 56 protruding from the main body. A first supporting part 57 and a second supporting part 58, which is spaced apart from the first supporting part 57, is arranged on the main body 55. The axial securing element 29 is arranged between the supporting parts 57, 58 and can be supported or is supported on the supporting parts 57, 58.

The first supporting surface 32 is supported, in particular directly, on the second supporting part 58. The second supporting surface 35 is supported, in particular directly, on the first supporting part 57. By rotation of the lever element 53, in particular the lever part 56, in the first direction of rotation 54, the supporting parts 57, 58 move relative to the base 9 in the first direction 33. As a result, the axial securing element 29 is subjected by the first supporting part 57 to a force acting in the first direction 33, as a result of which the axial securing element 29 is moved in the first direction 33. The screw element 26 can thereby be pushed in a defined manner into the sleeve 28 and into the thread of the propeller shaft 8. FIG. 15 shows the lever element 53 in a first rotational position.

Figure 16:
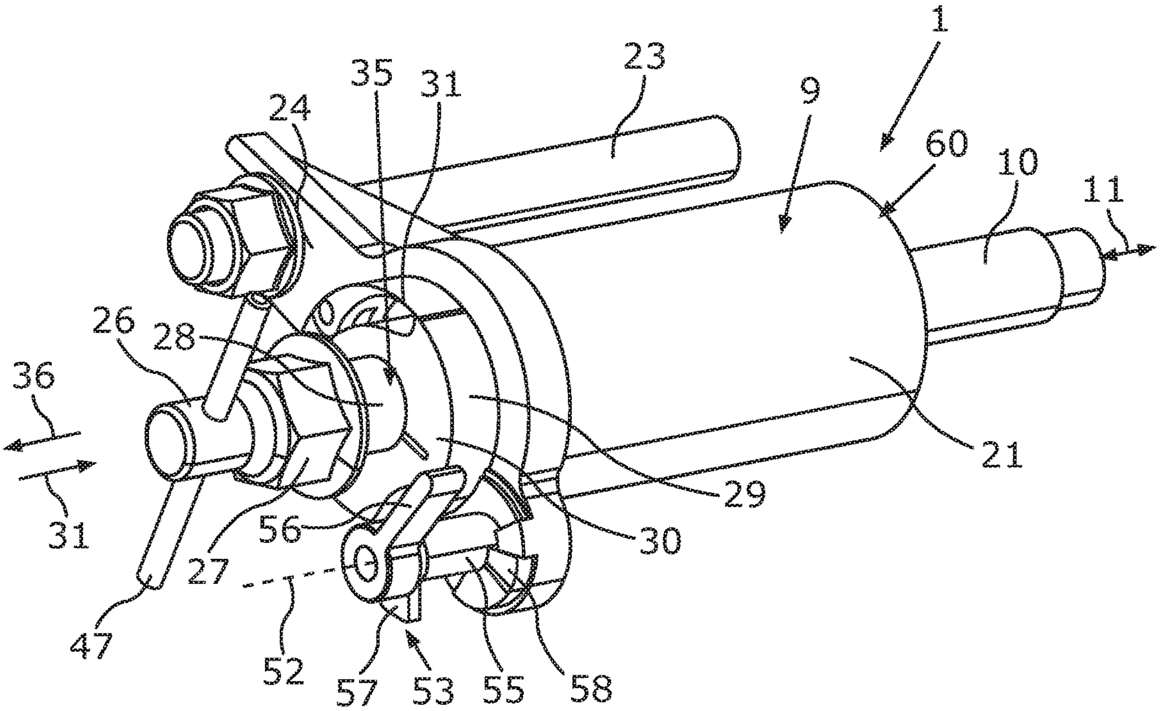
FIG. 16 shows a schematic perspective view of the tool according to a further embodiment with a lever element in a second rotational position.

FIG. 16 shows, in a schematic perspective view, the tool 1, wherein the lever element 23 is in a second rotational position different from the first rotational position. In the second rotational position, the counter surface 34 is released from the second supporting part 58. As a result, the axial securing element 29 can be slid in the first direction, by rotation of the lever element 53, until the axial securing element 29 directly touches the counter surface 34.

Provision is preferably made that the lever element 53 is mechanically coupled to the axial securing element 29 in such a manner that, when the lever element 53, in particular the lever part 56, rotates in a second direction of rotation 59 opposed to the first direction of rotation 54, a translational movement of the axial securing element 29 relative to the base 9 in the second direction 36, which coincides with the sliding direction 11 and is opposed to the first direction 11, can be brought about. By rotation of the lever element 53, in particular the lever part 56, in the second direction of rotation 59, the supporting parts 57, 58 move in the second direction 36 relative to the base 9. As a result, the axial securing element 29 is subjected by the second supporting part 58 to a force acting in the second direction 36, and the axial securing element 29 is thus moved in the second direction 36.

In a further refinement, provision is made that the base 9 has a supporting region 60 via which the base 9 can be supported on a wheel suspension of the motor vehicle. For example, provision is made that, in the state fastened to the vehicle wheel 2, the base 9 is supported in its radial direction on the wheel hub 6 or on a rim 61 of the vehicle wheel 2.

For example, a securing element is provided for securing a screw connection against release of the screw connection which is formed by the screw element 26 screwed into the thread of the propeller shaft 8. Expressed in other words, the securing element is provided for locking the screw element 26 with the sleeve 28 and a threaded nut in relation to an axial side shaft screw connection. The securing element is, for example, a nut or a spring.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE CHARACTERS

- 1 tool
- 2 first drive wheel
- 3 rim
- 4 tire
- 5 wheel hub
- 6 wheel bearing
- 7 wheel carrier
- 8 propeller shaft
- 9 base
- 10 actuating element
- 11 double arrow
- 12 toothing engagement
- 13 toothing
- 14 toothing
- 15 travel limiting device
- 16 wheel screw
- 17 collar screw
- 18 screwhead
- 19 passage opening
- 20 wheel hub cover
- 21 plastics sleeve
- 22 plastics ring
- 23 screw-in element
- 24 base element
- 25 screwhead
- 26 threaded rod
- 27 lock nut
- 28 sleeve
- 29 axial securing element
- 30 main body
- 31 clamp
- 32 first supporting surface
- 33 arrow
- 34 counter surface
- 35 second supporting surface
- 36 arrow
- 37 guide element
- 38 head
- 39 clamp
- 40 sliding sleeve
- 41 arrow
- 42 arrow
- 43 arrow
- 44 arrow
- 45 arrow
- 46 sliding sleeve
- 47 mounting aid
- 48 first blocking element
- 49 first receiving region
- 50 second receiving region
- 51 second blocking element
- 52 axis of rotation
- 53 lever element
- 54 first direction of rotation
- 55 main body
- 56 lever part
- 57 first supporting part
- 58 second supporting part
- 59 second direction of rotation
- 60 supporting region
- 61 rim

What is claimed is:

1. A tool for transferring a motor vehicle into a rollable state despite a parking lock having been activated, comprising:

a base which is fastenable to a vehicle wheel of the motor vehicle;

an actuating element which is displaceable along a sliding direction relative to the base and via which, in a state of the base fastened to the vehicle wheel, by displacement of the actuating element along the sliding direction relative to the base, a toothing engagement between a first toothing of a propeller shaft of the motor vehicle and a second toothing of a wheel hub can be undone such that the motor vehicle is transferable into the rollable state; and a travel limiting device, wherein a travel by which the actuating element is displaceable at most relative to the base in order to undo the toothing engagement is specifiable by the travel limiting device;

wherein the travel limiting device has an axial securing element which is supportable along the sliding direction at least indirectly on the base and which is adjustable between:

a release state, in which the axial securing element is displaceable along the sliding direction relative to the actuating element; and a blocking state, in which relative movements along the sliding direction between the axial securing element and the actuating element are prevented such that, in the blocking state, the axial securing element is displaceable with the actuating element along the sliding direction relative to the base.

2. The tool according to claim 1, wherein the base has a screw-in element which is screwable to a thread, wherein the vehicle wheel is fastenable to the wheel hub by the thread, to fasten the base to the vehicle wheel.

3. The tool according to claim 1, wherein the actuating element has a screw element which is screwable to a thread of the propeller shaft and wherein the thread secures the toothing engagement.

4. The tool according to claim 3, further comprising a mounting aid disposed on the screw element, wherein the screw element is screwable to the thread of the propeller shaft by the mounting aid.

5. The tool according to claim 4, wherein in the state of the base fastened to the vehicle wheel, the actuating element is displaceable along the sliding direction relative to the base via the mounting aid.

6. The tool according to claim 3, further comprising a securing element, wherein the securing element secures a screw connection, which is formed by the screw element screwed into the thread of the propeller shaft, against release of the screw connection.

7. The tool according to claim 1, wherein the axial securing element has:

a first supporting surface via which the axial securing element is supportable in a first direction, which coincides with the sliding direction, on a countersurface of the base; and a second supporting surface which faces away from the first supporting surface in a second direction coinciding with the sliding direction and opposed to the first direction.

8. The tool according to claim 7, wherein the travel limiting device has:

a guide element which is disposed on the base and is immovable at least along the sliding direction relative to the base; and a travel limiting element which is displaceable along the sliding direction and along the guide element relative to the base, the axial securing element, the actuating element and the guide element in a manner guided between a first sliding position and a second sliding position, wherein:

in the first sliding position:

the travel limiting element is pivotable relative to the base, the axial securing element, the actuating element and the guide element between a first limiting position, in which the axial securing element is supportable via the first supporting surface on the travel limiting element which is disposed between the first supporting surface and the countersurface in the first limiting position, and a first release position, in which the travel limiting element permits support of the axial securing element on the countersurface of the base via the first supporting surface; and in the second sliding position:

the travel limiting element is pivotable relative to the base, the axial securing element, the actuating element and the guide element between a second limiting position, in which the axial securing element is supportable via the second supporting surface on the travel limiting element, which is in the second limiting position, in the second direction, and a second release position, in which the second supporting surface is disposed without overlapping with the travel limiting element as viewed in the second direction.

9. The tool according to claim 8, wherein a displacement path by which the travel limiting element is displaceable along the guide element and along the sliding direction is precisely a same size as a distance running along the sliding direction between the first supporting surface and the second supporting surface.

10. The tool according to claim 1, wherein the travel limiting device has a blocking element which is arrangeable in a receiving region of the base, wherein the blocking element arranged in the receiving region is movable translationally relative to the base between a first position, in which the axial securing element is movable translationally in a first direction, which coincides with the sliding direction, relative to the base, and a second position, in which translational movement of the axial securing element in the first direction is stopped.

11. The tool according to claim 10, wherein the base has a second receiving region which is spaced apart from the receiving region and in which a blocking element is arrangeable, wherein the blocking element arranged in the second receiving region is movable translationally relative to the base between a first position, in which the axial securing element is translationally movable relative to the base in a second direction, which coincides with the sliding direction and is opposed to the first direction, and a second position, in which translational movement of the axial securing element in the second direction is stopped.

12. The tool according to claim 1, wherein the travel limiting device has a lever element which is rotatable about an axis of rotation and is coupled mechanically to the axial securing element such that, when the lever element rotates in a direction of rotation, a translational movement of the axial securing element along the sliding direction relative to the base can be brought about.

13. The tool according to claim 1, wherein the base has a plastics element via which the base is supportable on the vehicle wheel.

14. The tool according to claim 1, wherein the base has a supporting region via which the base is supportable on a wheel suspension of the motor vehicle.

15. The tool according to claim 1, wherein the base, in the state fastened to the vehicle wheel, is supported in a radial direction on the wheel hub or on a rim of the vehicle wheel.

16. A motor vehicle in combination with a tool:

the motor vehicle comprising:

a vehicle wheel;

a propeller shaft with a first toothing; and a wheel hub with a second toothing; and the tool comprising:

a base which is fastenable to the vehicle wheel of the motor vehicle;

an actuating element which is displaceable along a sliding direction relative to the base and via which, in a state of the base fastened to the vehicle wheel, by displacement of the actuating element along the sliding direction relative to the base, a toothing engagement between the first toothing of the propeller shaft of the motor vehicle and the second toothing of the wheel hub can be undone such that the motor vehicle is transferable into a rollable state; and a travel limiting device, wherein a travel by which the actuating element is displaceable at most relative to the base in order to undo the toothing engagement is specifiable by the travel limiting device.

17. A method, comprising the step of:

using a tool to bring a motor vehicle into a rollable state despite a parking lock of the motor vehicle having been activated by the tool, wherein the tool comprises:

a base which is fastened to a vehicle wheel of the motor vehicle;

an actuating element which is displaced along a sliding direction relative to the base and via which, in a state of the base fastened to the vehicle wheel, by displacement of the actuating element along the sliding direction relative to the base, a toothing engagement between a first toothing of a propeller shaft of the motor vehicle and a second toothing of a wheel hub is undone such that the motor vehicle is brought into the rollable state; and a travel limiting device, wherein a travel by which the actuating element is displaceable at most relative to the base in order to undo the toothing engagement is specifiable by the travel limiting device.

* * * * *